US007760730B2

(12) United States Patent
Goldschmidt et al.

(10) Patent No.: US 7,760,730 B2
(45) Date of Patent: *Jul. 20, 2010

(54) RULE SET VERIFICATION

(75) Inventors: Jason L. Goldschmidt, San Francisco, CA (US); Christoph L. Schuba, Menlo Park, CA (US); Michael F. Speer, Mtn. View, CA (US)

(73) Assignee: Oracle America, Inc., Redwood City, IA (US)

( * ) Notice: Subject to any disclaimer, the term of this patent is extended or adjusted under 35 U.S.C. 154(b) by 1177 days.

This patent is subject to a terminal disclaimer.

(21) Appl. No.: 10/868,556

(22) Filed: Jun. 15, 2004

(65) Prior Publication Data

US 2005/0278431 A1    Dec. 15, 2005

(51) Int. Cl.
*H04L 12/28* (2006.01)
(52) U.S. Cl. ...................................... 370/392
(58) Field of Classification Search ................ 370/230, 370/395.21; 713/201
See application file for complete search history.

(56) References Cited

U.S. PATENT DOCUMENTS

| 6,167,445 | A   | 12/2000 | Gai et al. |
| 6,182,228 | B1  | 1/2001  | Boden et al. |
| 6,466,984 | B1  | 10/2002 | Naveh et al. |
| 6,859,527 | B1  | 2/2005  | Banks et al. |
| 6,879,561 | B1  | 4/2005  | Zhang et al. |
| 7,340,469 | B1* | 3/2008  | Alghathbar et al. ........... 707/10 |
| 2002/0089929 | A1* | 7/2002 | Tallegas et al. ............. 370/230 |
| 2002/0186661 | A1 | 12/2002 | Santiago et al. |
| 2003/0023573 | A1 | 1/2003  | Chan et al. |
| 2003/0149766 | A1* | 8/2003 | Syvanne et al. ............. 709/224 |

(Continued)

FOREIGN PATENT DOCUMENTS

GB        2 356 762        5/2001

(Continued)

OTHER PUBLICATIONS

U.K. Patent Office communication Application No. GB0512208, Oct. 26, 2005.

(Continued)

*Primary Examiner*—Seema S Rao
*Assistant Examiner*—Wanda Z Russell
(74) *Attorney, Agent, or Firm*—Robert C. Kowert; Meyertons, Hood, Kivlin, Kowert & Goetzel, P.C.

(57) ABSTRACT

A flow manager may receive prioritized packet flow rules from one or more network services where each rule may include a packet filter and prioritized actions. Each action of a packet flow rule may be either terminating or non-terminating. A flow manager may generate a unified rule set according to the received packet flow rules and may additionally validate the unified rule set to identity errors. When validating the unified rule set, a flow manager may compare the unified rule set against one or more defined policies. Alternatively, a flow manager may apply the unified rule set to either captured or manually specified simulated network packets. A flow manager may also identity extraneous rules or actions. Further, a flow manager may present the unified rule set for manual verification and may receive input identifying errors and specifying modification to correct the errors.

57 Claims, 19 Drawing Sheets

U.S. PATENT DOCUMENTS

| | | | |
|---|---|---|---|
| 2004/0122967 A1* | 6/2004 | Bressler et al. | 709/232 |
| 2004/0177139 A1 | 9/2004 | Schuba et al. | |
| 2004/0199595 A1* | 10/2004 | Banister et al. | 709/207 |
| 2005/0022011 A1* | 1/2005 | Swander et al. | 713/201 |

FOREIGN PATENT DOCUMENTS

| | | |
|---|---|---|
| GB | 2 363 284 | 12/2001 |
| GB | 2399725 | 9/2004 |
| GB | 2411543 | 8/2005 |
| WO | 01/22686 | 3/2001 |
| WO | 2004/062206 | 7/2004 |

OTHER PUBLICATIONS

Baboescu et al., "Fast and Scalable Conflict Detection for Packet Classifiers," Dept of Computer Science and Engineering, University of California, San Diego, Computer Networks: The International Journal of Computer and Telecommunications Networking, vol. 42, Issue 6 (Aug. 2003) (16 Pages).

Eppstein et al., "Internet Packet Filter Management and Rectangle Geometry," Symposium on Discrete Algorithms, 2001, (9 Pages).

Hari et al., "Detecting and Resolving Packet Filter Conflicts," Bell Laboratories and Washington University, INFOCOM 2000, (10 Pages).

Bronstein et al., "Resolving Conflicts Between Service Rule Sets for Network Data Traffic in a System where Rule Patterns with Longer Prefixes Match Before Rule Patterns with Shorter Prefixes," Internet Storage and Systems Laboratory, HP Laboratories, HPL-2001-23 (R.1), Oct. 15, 2001, (24 Pages).

Baboescu et al., "Scalable Packet Classification," Department Of Computer Science and Engineering, University of California, San Diego, SIGCOMM '01, Aug. 27-31, 2001, (12 Pages).

Capra et al., "A Micro-Economic Approach to Conflict Resolution in Mobile Computing," ACM, 2001, (11 pages).

Mascolo et al., "An XML Based Programmable Network Platform," Proceedings of ICSE Workshop on Software Eng. And Mobility, May 2001, (5 pages).

Zanolin et al., "Model Checking Programmable Router Configurations," Dept. of Computer Science, University College London, 2002, (10 pages).

* cited by examiner

RULE SET VERIFICATION

BACKGROUND OF THE INVENTION

1. Field of the Invention

This invention relates to network flow policy enforcement in general, more particularly to verification of rule sets.

2. Description of the Related Art

Fast and scalable packet classification is frequently employed to enforce data flow policies in network topologies. Occasionally, two or more individual flow policy rules may conflict possibly causing violations to overall, high-level data flow policies. One algorithm for detecting such a conflict between two k-tuple filters creates a new packet filter when any conflict occurs as opposed to prioritizing filters. This algorithm may generally work for cyclic rule graphs as well, but may be slow, with $O(N^2)$ number of rules. Also, the total number of rules may increase exponentially with the number of rule conflicts, which may be a severe limitation in classifiers with limited space for rule tables.

Another common algorithm uses data structures for detecting rule set conflicts in time complexity $O(N^{(3/2)})$. However, this algorithm is based on rectangle geometry and may work only for a 2-dimensional case.

A different approach involves building tries for each filter field. Each level of a trie is one bit of the field. A bit vector from this trie is computed to aid in conflict detection. For a database of 20,000 rules, this algorithm may execute up to 40 times faster than a more naive implementation ($O(n^2)$).

Frequently, multiple administrative domains in a large-scale data center network managing multiple policies may lead to a number of problems such as:

Inefficiency. Today, multiple flow enforcement policies from multiple administrative scopes of a data center network frequently can't be integrated to allow for efficient operation of the network resources. For example, a flow enforcement policy that provides for the dropping of the packets of a network flow enforced at the server's edge may be wasteful of network resources.

Complexity. Management of multiple policies from multiple administrative scopes may be complicated and error prone.

Cost. A derivative of complexity may be increased cost. Generally, if a data center network is complex to manage, it may also be costly to operate.

SUMMARY

Flow managers may, according to certain embodiments, verify and increase the observability of data flow policies as applied to packet flows in a data center network by processing a packet flow rule set to present a consistent, collapsed view of network service policy to observers, such as network administrators, specialized software agents, or network management tools.

According to certain embodiments, this approach may be performed before network services go on-line, thus reducing the chances of policy violation or other errors during live operation. In some embodiments, verification and observation, both before and during on-line operation of network services, may be employed as a way of verifying, validating, and monitoring policy design and deployment.

Unified rule sets, such as those created by a flow manager, may represent how a particular matching flow would be processed as it traverses various network services. They may also enable such functionality as semantic validation of original rule sets, identification of sub-optimal paths, or simulation and debugging of data traffic processing.

A flow manager may, in various embodiments, employ different approaches to verifying network service configurations and identifying potential optimizations or misconfigurations. Such approaches may include, among others:

presentation of unified rule set to an administrator for manual verification.

flagging of potential misconfiguration as defined by administrator policy.

simulation of work load processing to meet a success criteria.

flagging or notification of unnecessary or extraneous rules.

After verifying a unified rule set, a flow manager may also take action to handle any rules have been identified for optimization or as misconfigurations. This may include, but not be limited to:

manual changes to network services configuration rule set modification (either manual or programmatic)

action list modification (either manual or programmatic)

no operation in the case of false positives.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
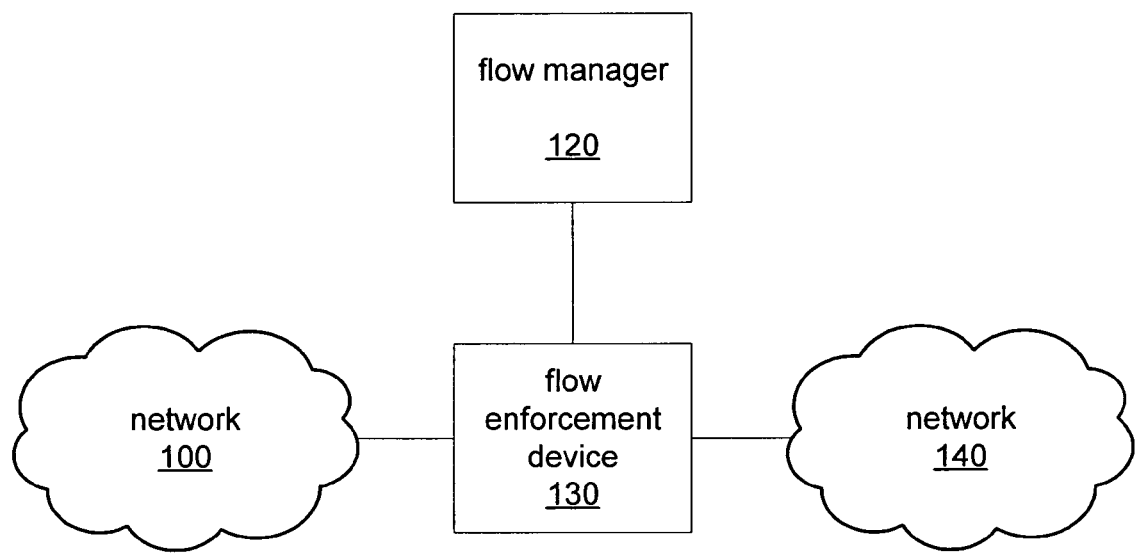
FIG. 1 is a block diagram illustrating, according to one embodiment, several network computers including a flow manager and a flow enforcement device.

FIG. 1 is a block diagram illustrating, according to one embodiment, several networked computers including a flow manager and a flow enforcement device. In certain embodiments, a flow manager, such as flow manager 120, may receive packet flow rules from various external entities or network services and generate a unified rule set for enforcement by one or more flow enforcement devices, such as flow enforcement device 130.

A flow enforcement device, such as flow enforcement device 130, may be built using network processors to classify data traffic flows at high speeds and may perform a sets of actions on network data packets. A flow enforcement device may also, according to various embodiments, have capabilities that include, but are not limited too: load balancing, firewalling, fail-over, QoS, content inspection/layer 7 processing, and address management. In certain embodiments, a flow enforcement device, such as flow enforcement device 130, may be configured to perform such actions on network traffic between network 100 and network 140.

According to certain embodiments, a flow manager may take rules from multiple sources and generate a consistent, unified rule set that is conflict free and enforceable by flow enforcement devices. In such embodiments, each received packet flow rule may include a packet filter and an action list. The packet filter may define a set of data packets on which operations defined by the action list may be performed. To help ensure that the unified rule set is conflict free, a flow manager may, in some embodiments, clearly resolve every rule conflict according to the priority policy. In order to ensure that the rules of the unified rule set are enforceable by flow enforcement devices, a flow manager may ensure that the unified rule set expresses the same priority policy whether analyzed using longest prefix matching or ordered precedence.

Multiple priority levels may be preserved when creating a unified rule set. Firstly, each network service may be assigned a priority and therefore set of packet flow rules received from different network services may be sorted using each network service's priority, according to certain embodiments. Additionally in such embodiments, multiple rules from a single network service may be prioritized using either longest prefix or ordered precedence and the actions specified by the packet flow rules are prioritized through their order in each rule's action list.

According to some embodiments, a flow manager may start with an empty unified rule set, and subsequently may add received packet flow rules to the unified rule set. Every rule that is added to the unified rule set may be compared to rules already in the unified rule set to detect conflicts. A flow manager may also add rules to the unified rule set according to the particular priority order for those rules as specified by the network service that supplied those rules, in one embodiment.

For example, a flow manager may first sort the received rules by the priority of the network services that supplied them. Rules from the same network service may be sorted according to either longest prefix or ordered precedence, depending on how the network service supplied them. And lastly, the lexicographical ordering of the rules may be used to sort any rules that cannot be sorted using the above methods, according to one embodiment. In other embodiments, other priorities may be used.

For example, in one embodiment, a flow manager may sort the unified rule set such that rules with higher service priority come before rules with lower service priority. Thus, when applying the unified rule set to data packets during live network traffic, a flow enforcement device may apply the higher priority rules before applying the lower priority rules, according to one embodiment. Rules with equal service priority may be sorted according to ordered precedent. Please note that rules received using longest prefix ordering may be reordered according to ordered precedent ordering and that the preexisting priority order of such rules may be preserved, according to certain embodiments. After such sorting and rule conflict resolution, the unified rule set may contain a set of low-level rules that may be directly translated into different formats for specific flow enforcement devices, in one embodiment.

In certain embodiments, even through the unified rule set may be prioritized according to ordered precedence, flow manger 120 may ensure that the ordering of the rules in the unified rule set can also be sorted using longest prefix without changing the expressed priority of the rules. Thus, in some embodiments, the same unified rule set may be enforceable by flow enforcement devices that recognize longest prefix matching priority and those that recognize ordered precedent priority.

Figure 2:
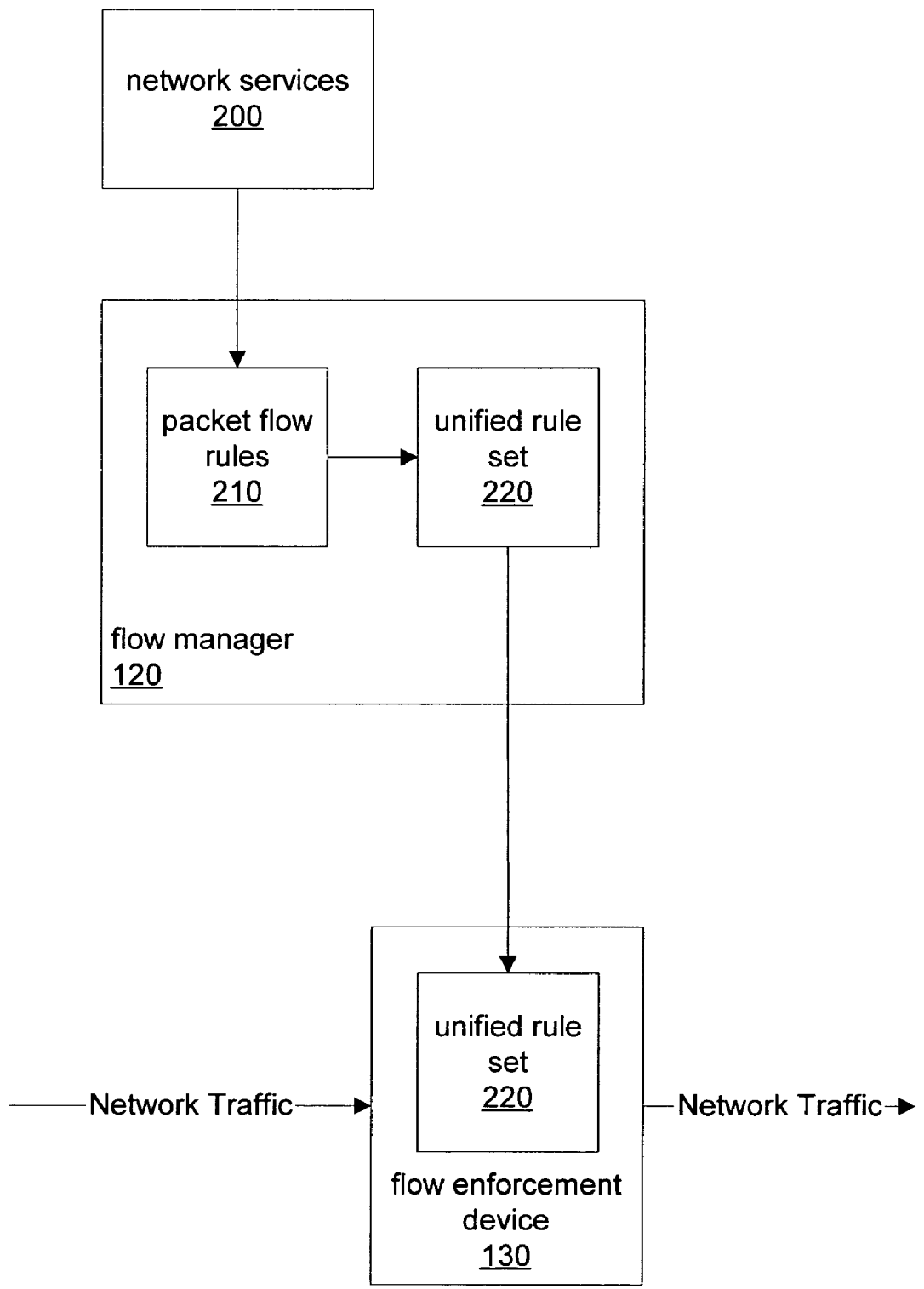
FIG. 2, is a block diagram illustrating a flow manager receiving packet flow rules and generating a unified rule set, according to one embodiment.

FIG. 2, is a block diagram illustrating a flow manager receiving packet flow rules and generating a unified rule set, according to one embodiment.

In certain embodiments, a flow manager, such as flow manager 120, may be configured to receive packet flow rules from external entities, such as network services 200. In some embodiments, Network services 200 may represent tier 0 network services including, but not limited to firewall, load balancing, fail over, and service level agreement monitoring. In other embodiments, network services 200 may represent one or more application agents, or even other flow managers, as described herein.

Individual network services may specify priority among the rules they supply to a flow manager, such as flow manager 120, by either ordered precedence or by longest prefix. In ordered precedence matching, rules are considered one at a time, in the order specified. The first matching rule is applied and its action list is executed. In longest prefix matching, rules that have a longer common prefix length are considered before rules that have shorter common prefix lengths. Again, the first matching rule is applied and its action list is executed.

In certain embodiments, network services 200 may, through the supplied packet flow rules, instruct flow manager 120 which actions a flow enforcement device is supposed to perform on what data packets. Because packet flow rules stem from various services and applications (or even similar applications on different hosts), a data packet may be the subject of multiple actions of more than a single rule, in one embodiment. Thus, two or more rules may conflict by having packet filters that match the same data packet(s).

Additionally, in some embodiments, a flow manager, such as flow manager 120, may also receive policies, such as information expressing priorities between different network services. In one embodiment each network service may supply its own priority level when supplying packet flow rules. In other embodiments, an administrator may provide the priorities for one or more network services to flow manager 120. In turn, flow manager 120 may, in one embodiment, create a unified rule set, such as unified rule set 220, including low-level rules enforceable by high performance network processors or flow enforcement devices, such as flow enforcement device 130, that operate in the data path.

Flow manager 120 may, according to certain embodiments, aggregate and integrate packet flow rules and actions for data traffic policies of multiple network services into a single policy of rules and actions that implement those data traffic policies. Moreover, this unification of data traffic policies may provide for the virtualization of these services while preserving the actual policy enforcement and mapping of service semantics to physical hardware semantics, in some embodiments.

According to some embodiments, flow manager 120 may, when generating unified rule set 220, employ an algorithm, such as the ordered precedence longest prefix rule cruncher (OPLPRC) algorithm, to help determine how received packet flow rules 210 should be modified so as to be enforceable by flow enforcement devices, such as flow enforcement device 130. Thus, in some embodiments, flow manager 120 may receive packet flow rules 210 from network services 200 and may generate unified rule set 220 for enforcement by flow enforcement device 130.

Figure 3:
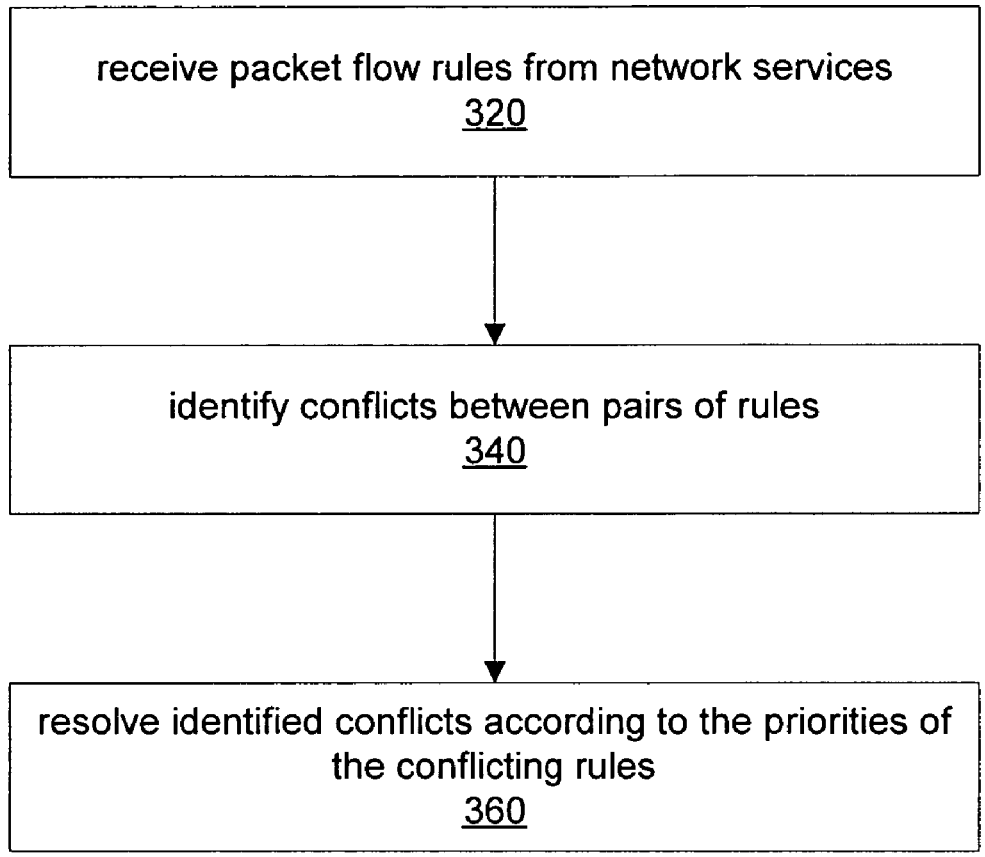
FIG. 3 is a flowchart illustrating a method for generating a unified rule set, according to certain embodiments.

FIG. 3 is a flowchart illustrating a method for generating a unified rule set, according to certain embodiments. In one embodiment, a flow manager, such as flow manager 120, may be configured to receive packet flow rules from network services, as illustrated by block 320. As described above, flow manager 120 may receive packet flow rules from various external entities, such as network services 200. According to such an embodiment, each received packet flow rule may comprise a tuple including a packet filter and an action list. The packet filter may define a set of data packets on which operations defined by the action list may be performed.

Additionally, in one embodiment, flow manager 120, may identify conflicts between pairs of rules, as illustrated by block 340. For example, a flow manager, such as flow manager 120, may determine whether individual rules of received packet flow rules 210 conflict. For instance, If two rules are determined to apply to identical data packets, flow manager 120 may also determine which of the conflicting rule has higher priority and may, in certain embodiments, create a set of low level rules with possibly modified action lists that accurately enforce the desired priority of actions for any given traffic flow.

According to some embodiments, actions of packet flow rules may specify, for example, dropping a packet, gathering statistical information, controlling timer functions, checksum calculation, modifying (a.k.a. marking) a packet with metadata (e.g., inserting new fields or overwriting existing fields), or passing the packet on (i.e., doing nothing.) Please note that the foregoing list is not exhaustive and other embodiments may include additional types of actions. Each packet filter of a packet flow rule may include patterns that may be matched against various fields of actual data packets and each packet filter may therefore include multiple field filters, according to various embodiments.

According to one embodiment, each field filter of a packet flow rule may contain a field name and a field pattern. A field name may identify (in a one-to-one correspondence) a header field of a data packet. For example, in one embodiment, a field name may identity an IP source address or in another embodiment a field name may identify the last 4 bits of the IP destination address. In certain embodiments, a field pattern may be composed of a bit string that may determine which packets match the header field identified by the field name. Such a bit string may, in some embodiments, consist of set bits (1), clear bits (0), or so-called "don't care" bits (d). According to some embodiments, a specific field of a data packet may match a packet filter if all set and clear bits in the field pattern exactly match corresponding bits in the data packet field. Any don't care bits specified by the field pattern can match either clear bits or set bits in the data packet field.

Since, in some embodiments, a packet filter may include multiple field filters, a data packet may match a packet filter if all field filters of the packet filter match the corresponding fields of the data packet. Thus, a data packet may match a rule if the rule's packet filter matches all of the data packet fields. For example, in one embodiment, the filter <IP-source-address, 128.12.30.151> matches all data packets whose IP source address is 128.12.30.151. The filter <IP-source-address, 128.12.*.*> matches all packets in the 16-bit masked subnet 128.12. Note that each asterisk symbol ('*'), as used herein, denotes 8 consecutive 'don't care' bits. A different notation for specifying don't care bit masks that are contiguous, and right-aligned lists the number of don't care bits following the IP address, separated by the slash symbol. For example, 128.12.30.151/16 denotes that the rightmost 16 bits in the IP address can be anything. In fact, the two examples, 128.12.30.151/16 and 128.12.255.255/16, denote the identical pattern 128.12.*.*.

Flow manager 120 may also be configured to resolve any identified conflicts according to the priorities of the conflicting rules, as illustrated by block 360. When resolving conflicts between individual pairs of packet flow rules, a flow manager, such as flow manager 120, may be configured to analyze the priority relationship between the conflicting rule and may resolve the conflict by modifying the action list of one of the rules to include the actions of the other rule. In another embodiment, a flow manager also may be configured to modify a packet filter of one the conflicting rules to include the packet filter of the other rule. In yet another embodiment, flow manager 120 may be configured to create a new packet flow rule representing the combination of the two conflicting rules.

Figure 4:
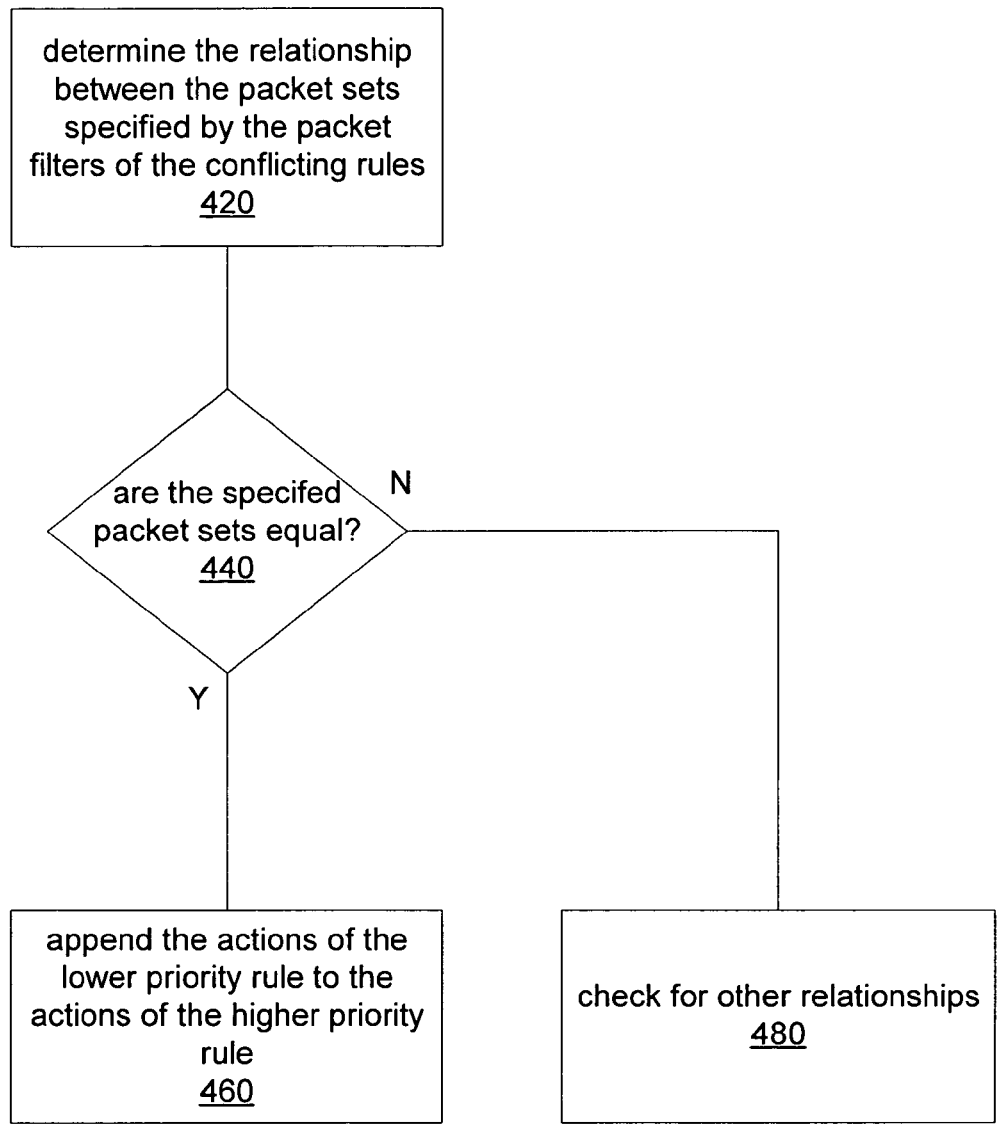
FIG. 4 is a flowchart illustrating a method, according to one embodiment, for resolving a conflict between two packet flow rules that comprise identity packet filters.

FIG. 4 is a flowchart illustrating a method, according to one embodiment, for resolving a conflict between two packet flow rules that comprise identical packet filters. For example, in one embodiment, a flow manager, such as flow manager 120, may be configured to determine the relationship between the data packet flow specified by the packet filters of the conflicting rules, as illustrated by block 420.

When determining whether two rules conflict, a flow manager, such as flow manager 120, may determine the exact manner in which the rule conflict. According to certain embodiments, two rules conflict if their packet filters specify overlapping, or identical, data flow packets. For example, two rules can have EQUAL packet filters, one rule's packet filter can be a SUBSET of another rule's packet filter, conversely, one rule's packet filter can be a SUPERSET of another rule's packet filter, or the two rules' packet filters can INTERSECT by both specifying a common subset of data packets. If two rules' packet filters have nothing in common, the two rules are DISJOINT.

For instance, conflicts between pairs of packet flow rules may be expressed as either a disjoint, equal, intersect, superset, or subset relationship. For example, given two rules r and r', two data packet sets S and S' may be specified by the packet filters of the respective packet flow rules. In such an example, Set S contains exactly those data packets that match the packet filter of rule r and similarly, set S' contains exactly those data packets that match the packet filter of rule r'. Thus, if no possible data packet can match the packet filters of both rules, the relationship between rule r and rule r' is disjoint. If every data packet that matches the packet filter of rule r also matches the packet filter of the rule r', the two rules represent an equal relationship. If the data packets that match the packet filter of rule r include all the data packets that match the packet filter of rule r', but also include other data packets, rule r has a superset relationship to rule r'. Conversely, if the data packets that match the packet filter of rule r include only some of the data packets that match the packet filter of rule r', rule r has a subset relationship to rule r'.

According to some embodiments, a flow manager may inspect each pair of corresponding filter fields of two rules and determines the individual field match relationship (DISJOINT, SUBSET, SUPERSET, or INTERSECT). If any two respective filter fields have a DISJOINT relationship, a flow manager may determine that the rules do not conflict, since no packet can match the complete packet filters of both rules.

Given two filter fields, a flow manager may compare the significant bits of the two fields for a match. In order to resolve conflicts between rules, a flow manager may modify the action list of the rule that has the longer prefix by prepending the actions of the rule with a higher priority. Before modifying the action list of a rules already in the unified rule set, a flow manager may, according to one embodiment, clone it to ensure that no potential conflicts with rules that are later added to the unified rule set are missed.

After determining the relationship between two conflicting packet flow rules, flow manager 120 may be configured to determine whether the two rules have an equal relationship, as illustrated by decision block 440. If the two rules do have an equal conflict relationship, flow manager 120 may, according to one embodiment, append the actions of the lower priority rule to the actions of the higher priority rule, as illustrated by block 460. According to certain embodiments, if flow manager 120 appends the actions of the lower priority rule to the actions of the higher priority rule, flow manager 120 may be configured to delete the lower priority rule, since is may now be redundant. In some embodiments, however, flow manager 120 may not actually delete the lower priority rule until after ensuring that all other conflicts involving the lower priority rules have been successfully and correctly resolved. If the two rules do not have an equal conflict relationship, flow manager 120 may check for other conflict relationships between the two rules, as illustrated by block 480.

Figure 5:
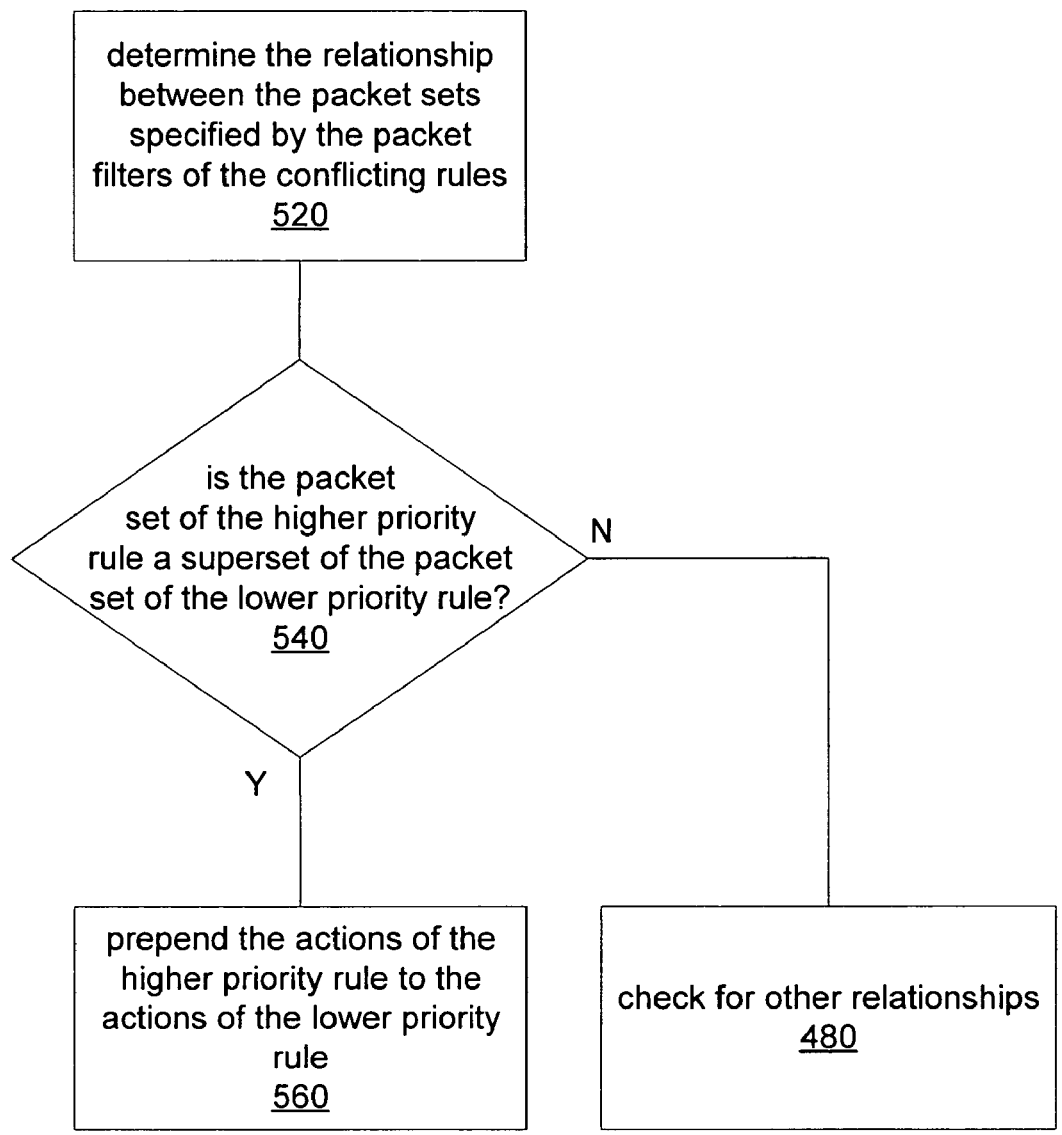
FIG. 5 is a flowchart illustrating a method, according to one embodiment, for resolving a conflict between two packet flow rules that comprise a superset conflict relationship.

FIG. 5 is a flowchart illustrating a method, according to one embodiment, for resolving a conflict between two packet flow rules that comprise a superset conflict relationship. In one embodiment, a flow manager, such as flow manager 120, may determine the relationship between the packet set specified by the packet filters of the conflicting rules, as illustrated by block 520. As described above, two conflicting packet flow rules may have either a disjoint, intersecting, superset, or subset conflict relationship according to the how the data packets specified by each rule's packet filter.

Additionally, a flow manager, such as flow manager 120, may be configured to analyze the priority relationship between the two conflicting rules. For instance, a flow manager may analyze and preserve multiple priority levels when generating a unified rule set. Each network service may be assigned a priority and therefore rules received from different network services may be analyzed using the supplying network service's priority. Additionally, multiple rules from a single network service may be prioritized by the supplying network service using either longest prefix or ordered precedence. And lastly, the actions included in the action list of a single packet flow rule may be prioritized by the order in which they are stored in the action list.

Thus, in one embodiment, flow manager 120 may determine whether the data packets specified by the packet filter of a higher priority rule represents a superset of the data packets specified by the packet filter of a lower priority rule, as illustrated by block 540. If a higher priority rule has a superset conflict relationship to a lower priority rule, a flow manager, such as flow manager 120, may prepend the actions of the higher priority rule to the actions of the lower priority rule, as illustrated by block 560.

Similarly to the method described above regarding FIG. 4, if the higher priority rule does not have a superset conflict relationship with the lower priority rule, flow manager 120 may check for other conflict relationship between the two conflicting rules, as illustrated by block 480.

Figure 6:
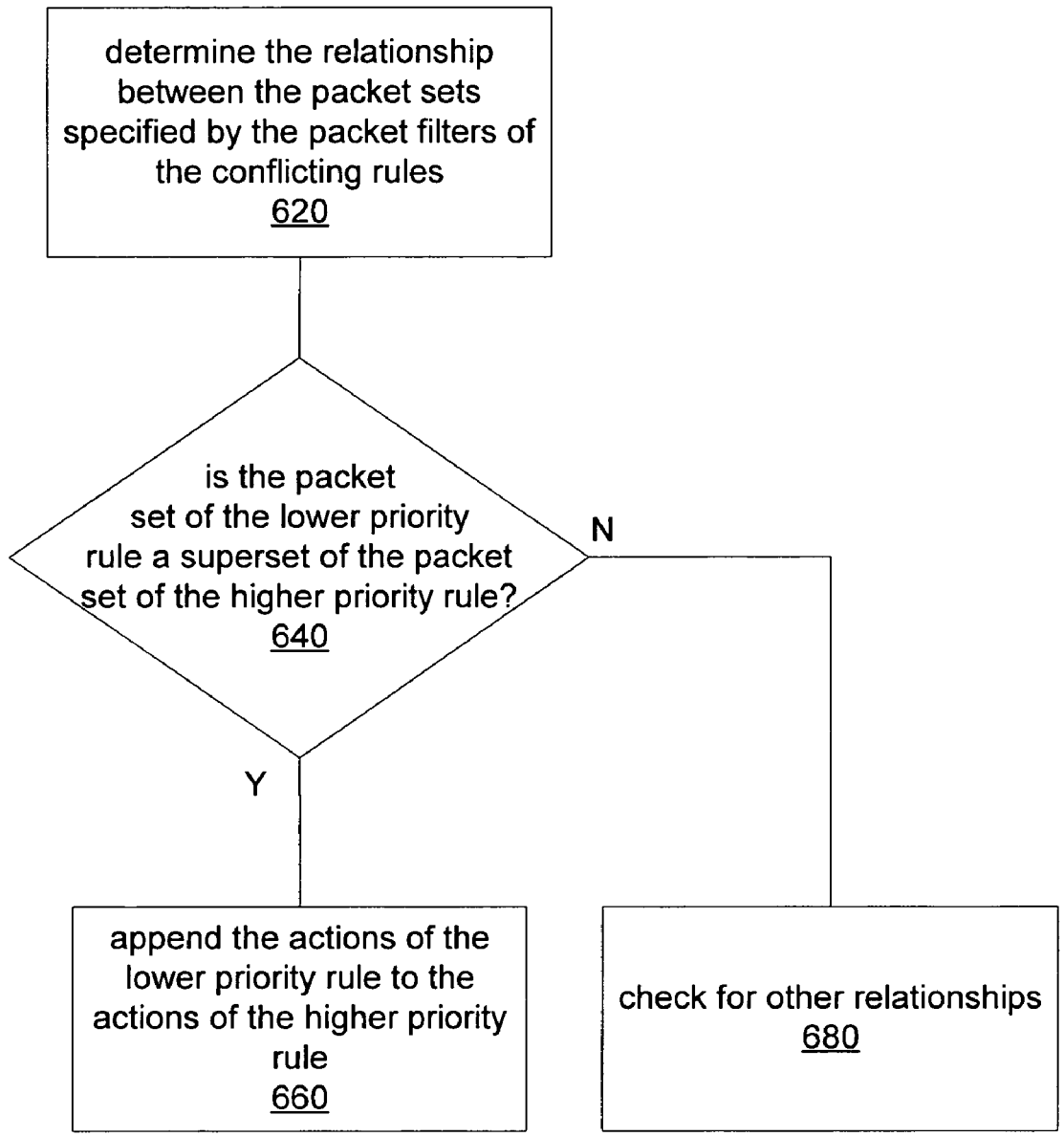
FIG. 6 is a flowchart illustrating another method, according to one embodiment, for resolving a conflict between two packet flow rules that comprise a superset conflict relationship.

FIG. 6 is a flowchart illustrating another method, according to one embodiment, for resolving a conflict between two packet flow rules that comprise a superset conflict relationship. In one embodiment, a flow manager, such as flow manager 120, may determine the relationship between the data packet set specified by the packet filter of the conflicting rules, as illustrated by block 620. As described above, two conflicting packet flow rules may have either a disjoint, intersecting, superset, or subset conflict relationship according to the how the data packets specified by each rule's packet filter.

Thus, in one embodiment, flow manager 120 may determine whether the data packets specified by the packet filter of a lower priority rule represents a superset of the data packets specified by the packet filter of a higher priority rule, as illustrated by block 640.

If a lower priority rule has a superset conflict relationship to a higher priority rule, a flow manager, such as flow manager 120, may append the actions of the lower priority rule to the actions of the higher priority rule, as illustrated by block 660.

Similarly to the method described above regarding FIGS. 4 and 5, if the higher priority rule does not have a superset conflict relationship with the lower priority rule, flow manager 120 may check for other conflict relationship between the two conflicting rules, as illustrated by block 680.

Figure 7:
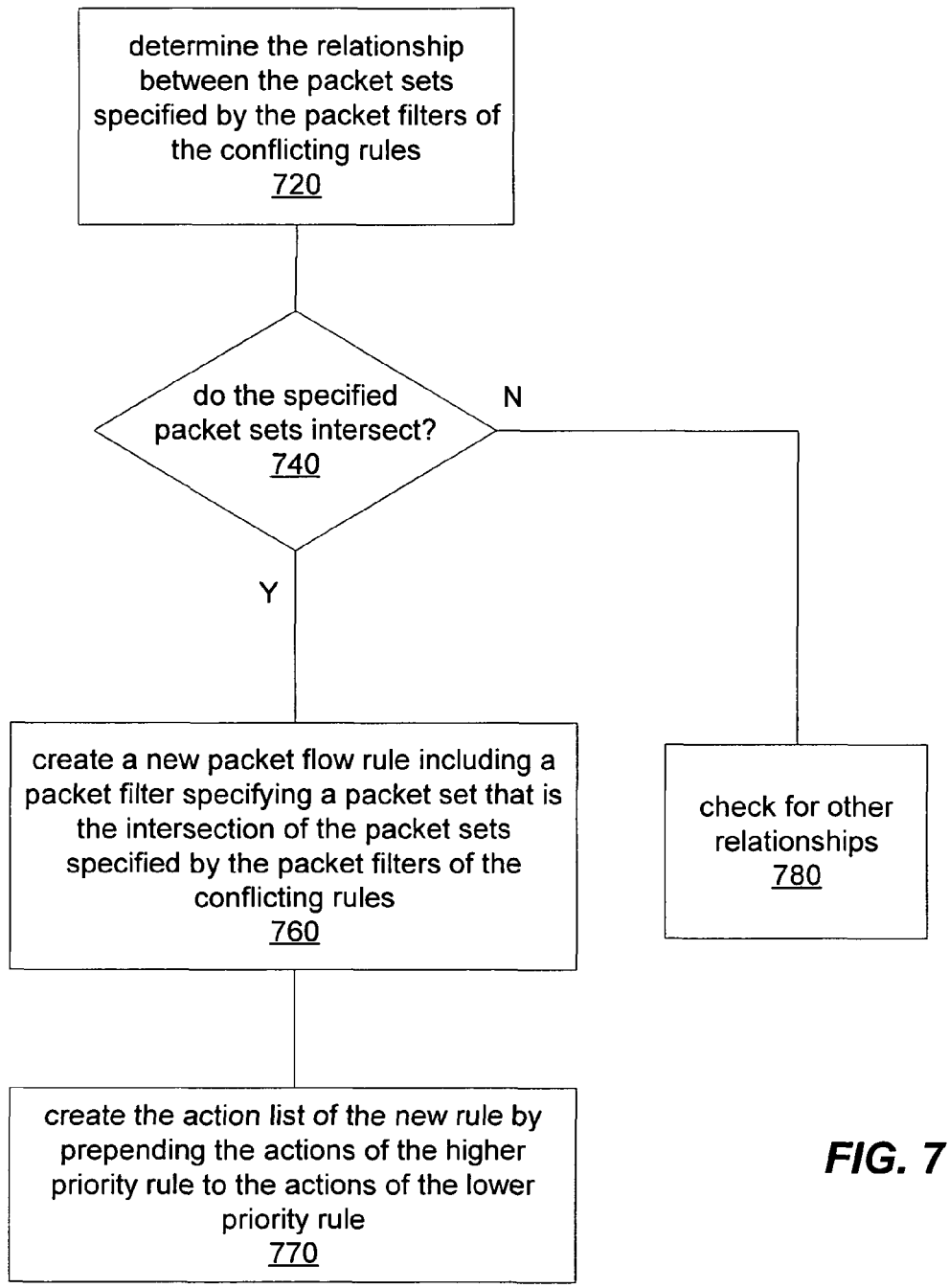
FIG. 7 is a flowchart illustrating a method, according to one embodiment, for resolving a conflict between two packet flow rules that comprise an intersecting conflict relationship.

FIG. 7 is a flowchart illustrating a method, according to one embodiment, for resolving a conflict between two packet flow rules that comprise an intersecting conflict relationship. In one embodiment, a flow manager, such as flow manager 120, may determine the relationship between the data packet set specified by the packet filter of the conflicting rules, as illustrated by block 720. As described above, two conflicting packet flow rules may have either a disjoint, intersecting, superset, or subset conflict relationship according to the how the data packets specified by each rule's packet filter.

Thus, in one embodiment, flow manager 120 may determine whether the data packets specified by the packet filters of the two conflicting packet flow rules intersect, and thus may determine whether the two packet flow rules have a intersecting conflict relationship, as illustrated by block 740.

If flow manager 120 determines that the two conflicting packet flow rules have a intersecting conflict relationship, flow manager 120 may create a new packet flow rule including a packet filter specifying a data packet set that is the intersection of the data packet sets specified by the packet filters of the conflicting packet flow rules, as illustrated by block 760. Additionally, after creating the a new packet flow rule as illustrated by block 760, flow manager 120 may, in one embodiment, create the action list for the newly created rule by prepending the actions of the higher priority rule to the actions of the lower priority rule, as illustrated by block 770. Similarly to the method described above regarding FIGS. 4-6, if the higher priority rule does not have a superset conflict relationship with the lower priority rule, flow manager 120 may check for other conflict relationship between the two conflicting rules, as illustrated by block 780.

Figure 8:
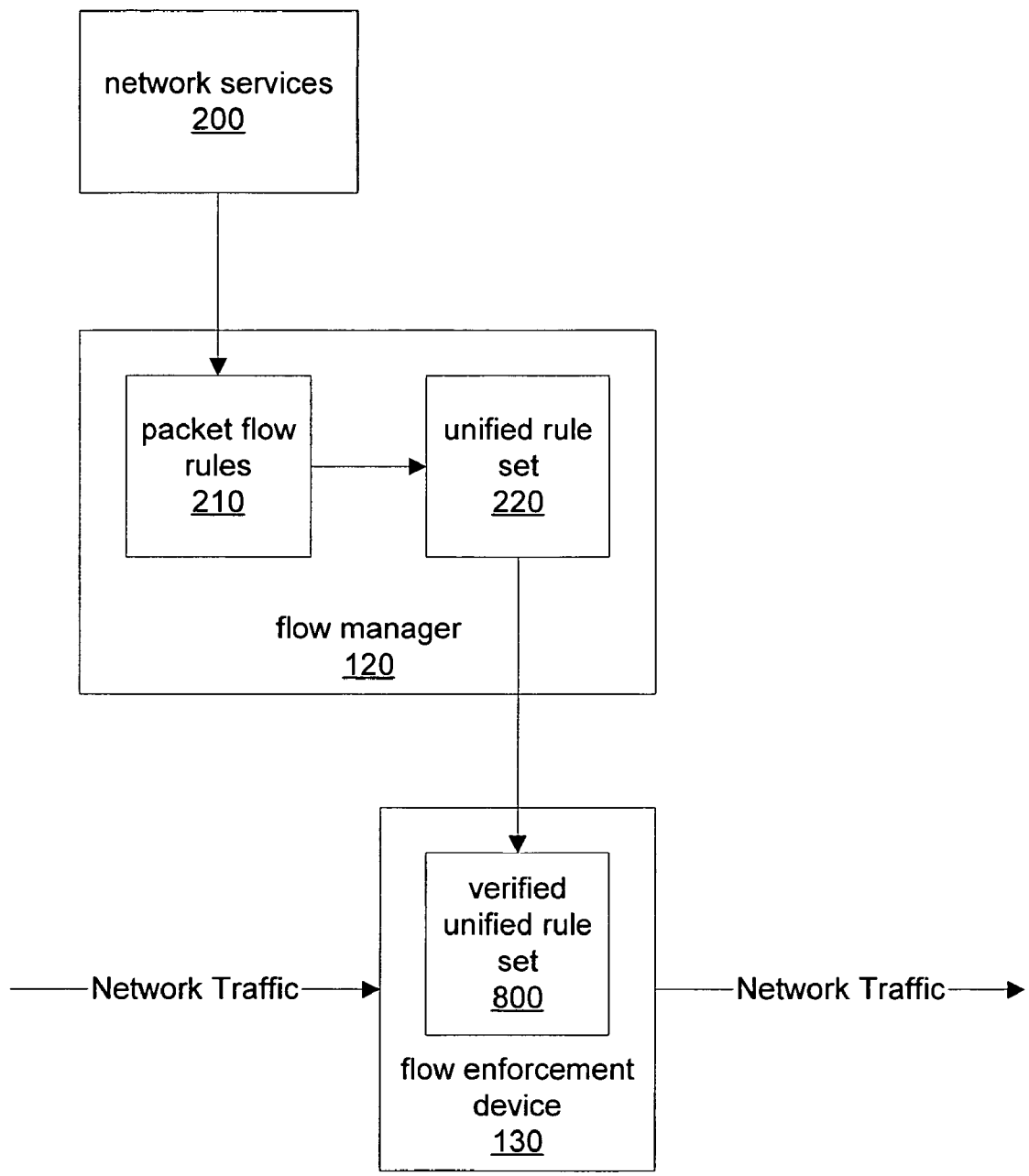
FIG. 8 is a block diagram illustrating, according to certain embodiments, a flow manager validating a unified rule set before supplying it to a flow enforcement device.

FIG. 8 is a block diagram illustrating, according to certain embodiments, a flow manager validating a unified rule set before supplying it to a flow enforcement device.

A flow manager, such as flow manager 120, may, according to some embodiments, also provide a point of observation into the logical connection between virtualized network services and how individual network flows may be processed. This observability may be very powerful when attempting to prove the correctness of rule sets, identifying sub-optimal paths, simulating data traffic processing, and debugging specific network related issues.

In certain embodiments, packet flow rules may include a packet filter and an action list. Through the operation of generating a unified rule set, or rule crunching, as described herein, packet flow rules from different network services may be compared, conflicts may be resolved, and new rules may be created. Rules resulting from conflict resolution may have new action lists that are the concatenation, in priority order, of the actions from conflicting rules, according to certain embodiments.

Once rule crunching has completed, a unified rule set, that represents the aggregation and integration of all packet flow rules from contributing network services, may be generated. By prioritizing the actions within an action list, a flow manager may preserve the physical flow of packets through a particular segment of a data center. For instance, if a higher priority network service supplies a packet flow rule that includes a firewalling action and a lower priority network service supplies a rule that includes a load balancing action, based on the two rules' service priority relationship, the firewalling action should be performed before the load balancing action, and this same ordering should be represented in the action lists of the relevant rules from the unified rule set.

For example, a high-level firewall rule may specify that all data packets sent to webserver.example.com with a destination port of 80 should be allowed and a high-level load-balancing rule may specify that all traffic sent to webserver.example.com with a destination port of 80 be load balanced to group-web using weighted round robin. In such an example, a flow manager, such as flow manager 120, may be configured to determine that a conflict exists between these two rules, according to one embodiment. Since the specific type of conflict represents an equal relationship, flow manager 120 may resolve such a conflict by combining the two rules into a single new rule with an action list that represents the concatenation of the actions lists from each of the two original rules and such that the order of the actions in the action list of the new rule preserve the priority relationship of the original, conflicting rules.

Thus, in this specific example, the action list of the new rule would be the concatenation of the firewall rule followed by the load balancer rule. By observing this new action list it may be clear that any traffic sent to webserver.example.com:80 would be allowed into the network and then load balanced and therefore that the original priority relationship has been preserved in the final unified rule set.

Thus, in one embodiments, flow manager 120, after receiving packet flow rules 210 from network services 200 and after generating unified rule set 220 may verify unified rule set 220 before supplying verified unified rule set 800 to flow enforcement device 130.

Figure 9:
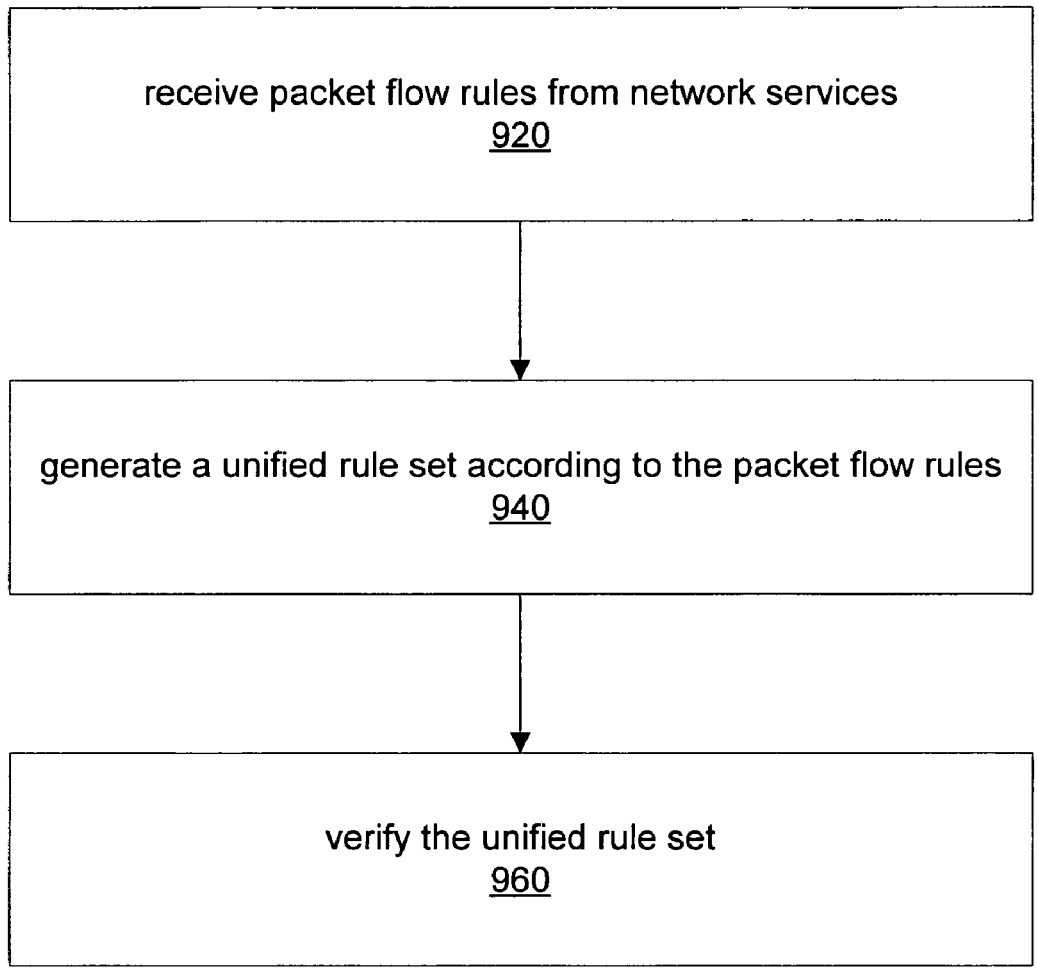
FIG. 9 is a flowchart illustrating, according to one embodiment, a method for verifying a unified rule set.

FIG. 9 is a flowchart illustrating, according to one embodiment, a method for verifying a unified rule set. In some embodiments, a flow manager, such as flow manager 120, may be configured to receive packet flow rules from network services, as illustrated by block 920 and described above. Additionally, as described above, flow manager 120 may, in some embodiments, generate a unified rule set according to the received packet flow rules, as illustrated by block 940.

According to certain embodiments, flow manager 120 may also verify the unified rule set, as illustrated by block 960. When validating a unified rule set, such as unified rule set 220, flow manager 120 may utilize various validation techniques, according to different embodiments. Thus, after generating a unified rule set, flow manager 120 may verify, and increase the observability of, the application and implementation of high-level flow policies. In various embodiments, such verifying may involve semantic validation of rule sets, identification of sub optimal paths, or the simulation and debugging of data traffic processing.

Figure 10:
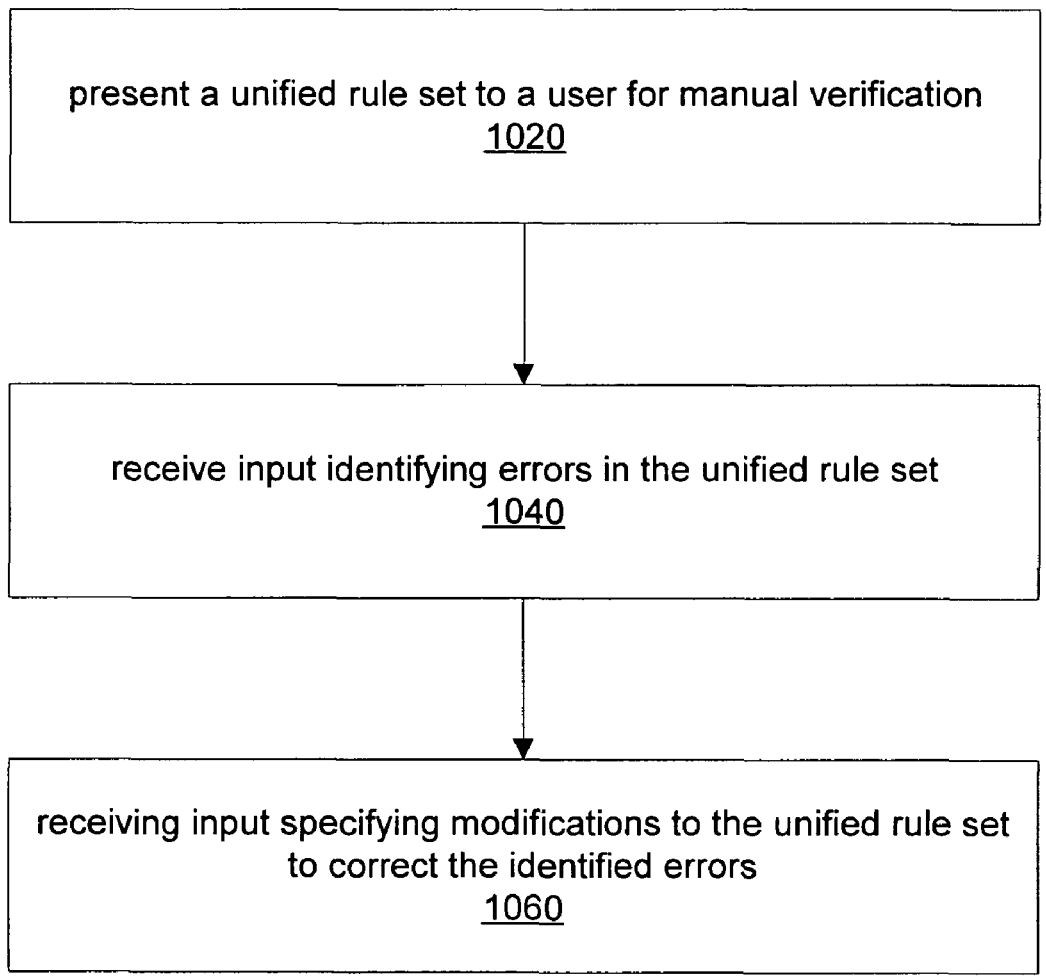
FIG. 10 is a flowchart illustrating, according to one embodiment, a method for validating a unified rule set through manual verification.

FIG. 10 is a flowchart illustrating, according to one embodiment, a method for validating a unified rule set through manual verification. In such an embodiment, a flow manager, such as flow manager 120, may be configured to present a unified rule set, such as unified rule set 220, to a user for manual verification, as illustrated by block 1020. In one such embodiment, flow manager 120 may present one or more rules of unified rule set 220 to a user, such as an administrator, a technician, or other user, for manual verification.

According to various embodiments, when a user inspects a unified rule set, such a user may only need to understand what the high-level business policies are for a particular data center. It may be assumed that the user has a strong understanding of these high level policies, because most likely, at some point, these policies needed to be translated to lower level network service configurations. Thus the user may be capable of verifying that the actions as specified by the unified rule set preserve such service level agreements and security polices.

By observing the concatenated actions lists resulting from the resolution of packet flow rule conflicts, it may be possible to verify network service configurations. According to various embodiments, this can be achieved by different means including, but not limited to: presenting a unified rule set to an administrator for manual verification, identifying potential misconfiguration as defined by administrator policy, simulating work load processing to meet a success criteria, and identification or notification of unnecessary or extraneous rules or actions.

After validating the unified rule set 200, flow manager 120 may handle all items identified through manual inspection, simulation, or programmatic identification. This handling may include, but is not limited to: manual changes to network services configuration, rule set modification (either manual or programmatic), action list modification (either manual or programmatic), and no operation in the case of false positives.

Figure 11:
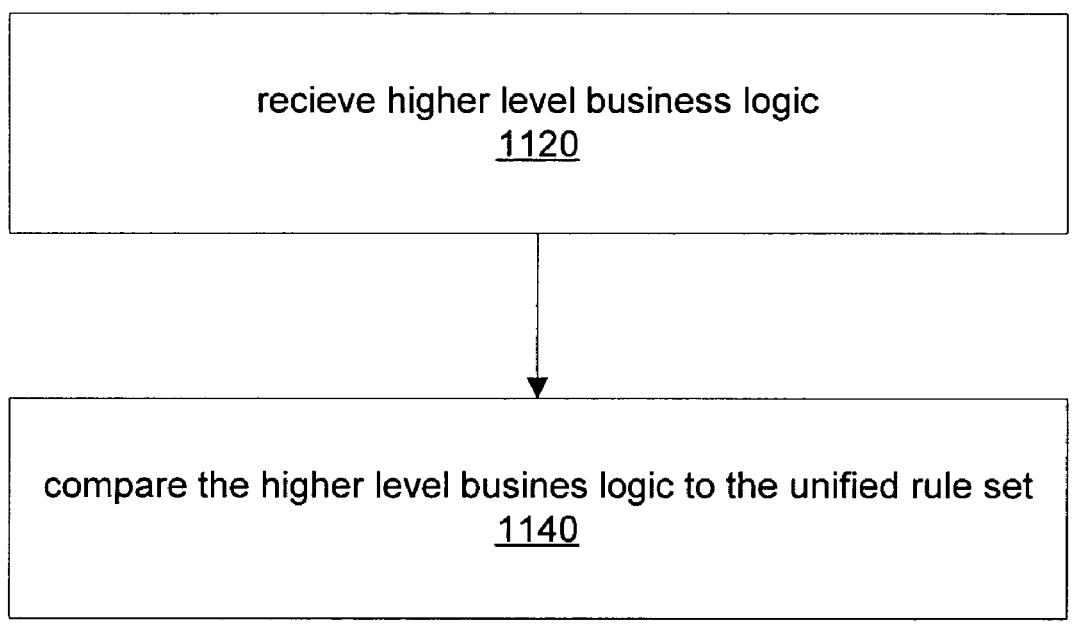
FIG. 11 is a flowchart illustrating, according to one embodiment, a method for validating a unified rule set through policy based verification.

FIG. 11 is a flowchart illustrating, according to one embodiment, a method for validating a unified rule set through policy based verification. In such an embodiment, policy based verification may involve taking higher-level business logic and comparing it against a unified rule set.

Thus, in certain embodiments, a flow manager, such as flow manager 120, may receive higher-level business logic, as illustrated by block 1120. For example, in one embodiment, flow manager 120 may receive information specifying higher level business logic from each network service supplying packet flow rules. In another embodiment, an administrator may supply the higher level business logic to flow manager 120, perhaps through a user interface or through another device configured to communicate such information to flow manager 120. In yet another embodiments, flow manager 120 may be configured to treat the original packet flow rules as received from network services as the higher level business logic.

Thus in some embodiments, after generating unified rule set 220, flow manager 120 may compare the higher level business logic to the unified rule set, as illustrated by block 1140. For instance, in one embodiment, flow manager 120 may compare each rule of unified rule set 220 to the business logic to ensure that no rule of unified rule set 220 violates any part of the higher-level business logic. In another embodiment, where flow manager 120 is configured to user the original received packet flow rules 210 as higher business logic, flow manger 120 may compare each rule of the packet flow rules 210 to the rules of unified rule set 220 to ensure that the logic of each original packet flow rule is preserved in unified rule set 220.

In certain embodiments, policy based verification could also be performed based on administrator defined policy. For example, an administrator may define a policy such that no packet flow rule of a unified rule set may include more than one terminating action. In another example, an administrator may define a policy such that no packet flow rule include an action list including a higher priority action modifying a data packet and also include a lower priority action dropping the modified data packet. By comparing administrator specified forms of misconfiguration a flow manager, such as flow manager 120, may be able to user policy based verification to find problems or sub-optimal configurations.

Figure 12:
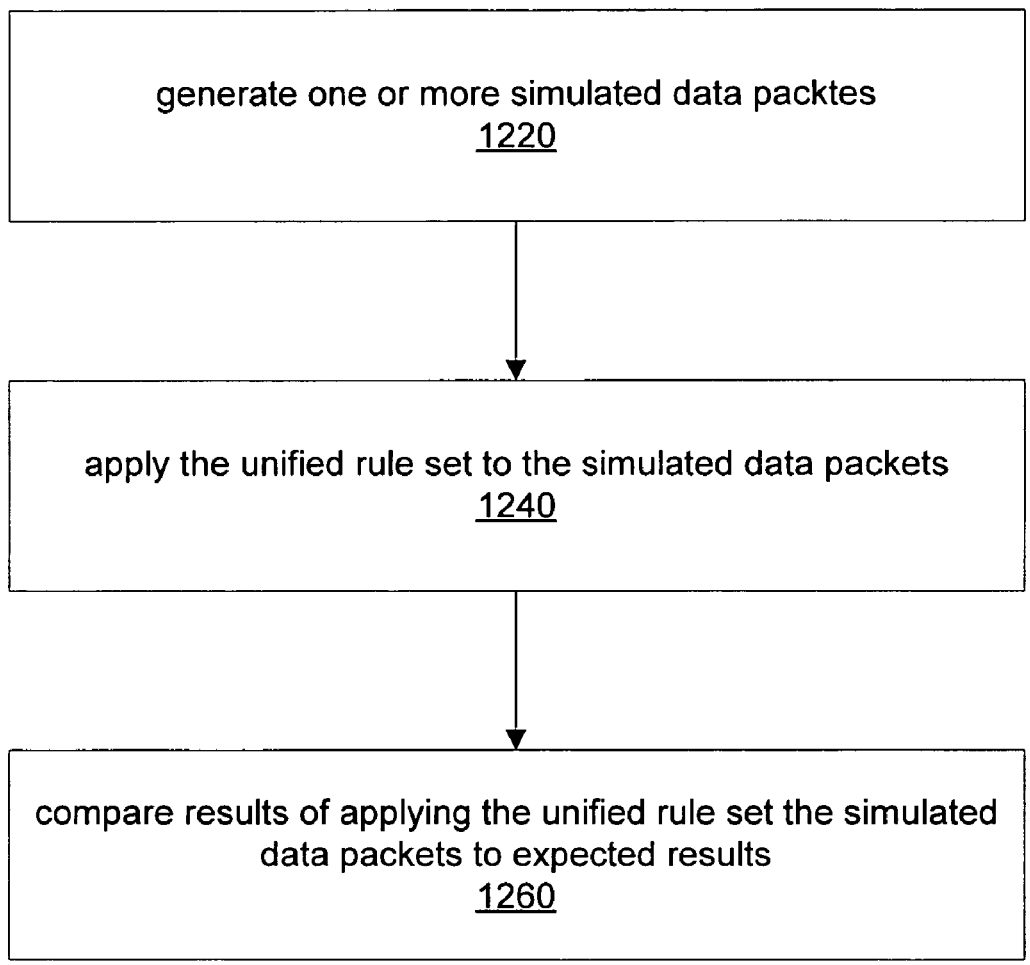
FIG. 12 is a flowchart illustrating one embodiment of a method for verifying a unified rule set through simulation.

FIG. 12 is a flowchart illustrating one embodiment of a method for verifying a unified rule set through simulation.

In one embodiment, flow manager 120 may generate one or more simulated data packets, as illustrated by block 1220. For example, flow manager 120 may generate one or more simulated data packets based on data packets captured during actual network traffic. In another embodiment, flow manager 120 may generate one or more simulated data packets based on information specifying source and destination addresses for the simulated data traffic.

In one embodiment, flow manager 120 may be configured to allow a user to create handmade packets for use as simulated data packets. By applying a unified rule set to handcrafted data packets, flow manager 120 may be able to allow a user to discover what actions would be applied to a particular packet during live network traffic.

In yet another embodiment, flow manager 120 may be configured to user simulated data packets that were manually created, or to use unmodified, captured data packets. In another embodiment, flow manager 120 may be configured to generate simulated data packets based upon the original packet flow rules received from various network services.

Thus, flow manager 120 may generate simulated data packets based on various sources, or may, in certain embodiments, use simulated data packets generated from different sources together when verifying or validating a unified rule set.

In such an embodiment, flow manager 120 may apply the unified rule set to the simulated data packets, as illustrated by block 1240. Thus, in one embodiment, flow manager 120, may apply each rule of unified rule set 220 to each of the simulated data packets and if a rule's packet filter matches the simulated data packet, apply the actions from the matching rule's action list to the simulated data packet.

Additionally, a flow manager, such as flow manager 120, may compare results of applying the unified rule set to the simulated data packets to expected results, as illustrated by block 1260, according to some embodiments. For example, flow manager 120 may record the results of applying the unified rule set to simulated data packets and compare the results to expected results. In one embodiment, flow manager 120 may receive the expected results from a user, such as an administrator. Alternatively, in another embodiment, flow manager 120 may present the results of applying the unified rule set to the simulated data packets so that a user may manually compare them to expected results. For example, when using captured flows as simulated data packets, flow manager 120 may, in one embodiment, generate a report describing how each simulated data packet would be handled by the unified rule set. Thus, this approach may enable regression testing for configuration changes to network services.

In another example, a customer may have purchased an email hosting account with a provider. The service level agreement (SLA), may guarantee 2 Mb/s of bandwidth for any email traffic originating or destined for the customer. The SLA may be enforced using a tri-color meter. After using the service for a while, with no issues, the customer may notice that when an email with a very large attachment is sent, the message fails to send. By utilizing verification through simulation, a flow manager may use the unified rule set for such a hosting providing as an input and may simulate packets sent by the customer to help determine where the exact problem occurs.

When investigating this problem, a natural instinct might be to investigate the client and server software being used for the transaction. This can be very costly, especially if they are not at fault. Perhaps the real issue was the tri-color meter that instead of specifying a level of burstiness to handle an increased load over a short period of time, the burstiness level may have been set equal to the allowed rate of 2 Mb/s. This may have caused all traffic that would have been labeled 'yellow' (i.e., the traffic bursts) to be labeled 'red' and immediately dropped.

By verifying the provider's traffic flow policies through simulation, a flow manager, such as flow manager 120, may allow a technician to see the full path traffic takes from this customer's site and determine exactly where data packets are dropped. For instance, flow manager 120 may user the provider's unified rule set and simulation packets generating from the customer's failed messages. Thus, by providing a clear view of the path taken by the customer's email traffic, flow manager 120 may help to quickly determine the root cause of the issue.

Figure 13:
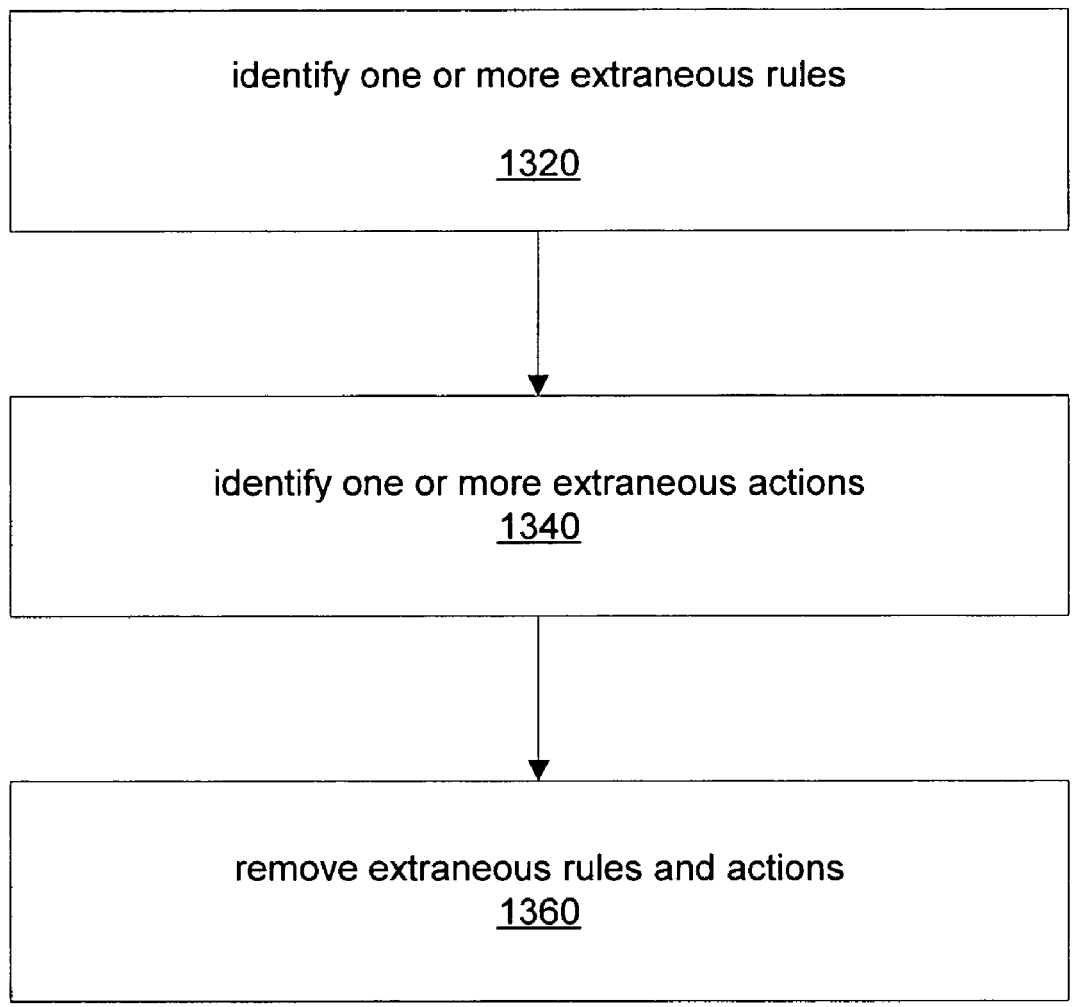
FIG. 13 is a flowchart illustrating, according to one embodiment, a method for verifying a unified rule set by identifying extraneous rules and actions.

FIG. 13 is a flowchart illustrating, according to one embodiment, a method for verifying a unified rule set by identifying extraneous rules and actions.

In one embodiment, a flow manager, such as flow manager 120, may be configured to identify one or more extraneous rules, as illustrated by block 1320. For example, in one embodiment, flow manager 120 may be configured to identify multiple rules with identical packet filters where a higher priority one of the rules includes a terminating action in its action list. In such an embodiment, the lower priority rules may be extraneous since any data packet matched by the lower priority rules' packet filter may be dropped by the higher priority rule, and thus the lower priority rules may never be applied to such a data packet.

In another embodiment, flow manager 120 may be configured to identify two rules with identical action lists, but where the higher priority rule has a packet filter that specifies a subset of the data packets specified by the packet filter of the lower priority rule. Thus, in such an embodiment, the lower priority rule may be extraneous since the higher priority rule may apply actions identical to those applied by the lower priority rule to any data packet that would be matched by the lower priority rule's packet filter.

Additionally, flow manager 120 may be configured, in one embodiment, to identify one or more extraneous actions, as illustrated by block 1340. For example, in one embodiment, flow manager 120 may be configured to identify a rule that includes in its action list a terminating action that has a higher priority than one or more lower priority actions of the same action list. Thus, the lower priority actions may never by implemented or applied to data packets since the terminating action would be executed or applied first.

Furthermore, flow manager 120 may be configured to present a unified rule set to a user and may additionally be configured to receive input identifying one or more extraneous rules or action.

Flow manager 120 may also be configured, in one embodiment, to remove an identified extraneous rules or actions, as illustrated by block 1360. In other embodiments, however, a flow manager, such as flow manager 120, may not delete or remove extraneous rules or actions. In such embodiments, flow manager 120 may present or report any rules or actions identified as extraneous to an administrator.

Finding extraneous rules and actions may be similar to a lint code cleaning mechanism for network services. By trimming the rule set based on such lint-like suggestions, flow manager 120 may create a smaller overall rule set. For example, a packet flow rule may include an action list with a non-terminating action, such as a load balancing after a terminating action, such a drop action. Since the load balancing action may never be reached, a flow manager may identify the load balancing action as an extraneous action, in some embodiments.

In another, more complex, example, a packet flow rules may include terminating actions, like DROP, in the middle or at the end of the action list. In some cases, such a configuration may be intentional, such as when logging a packet before dropping it. In other cases, however, performing modifying or blocking operations on packet and then drop it afterward may by an error. By identifying these scenarios, flow manger 120 may allow administrators the opportunity to optimize rule sets.

Figure 14:
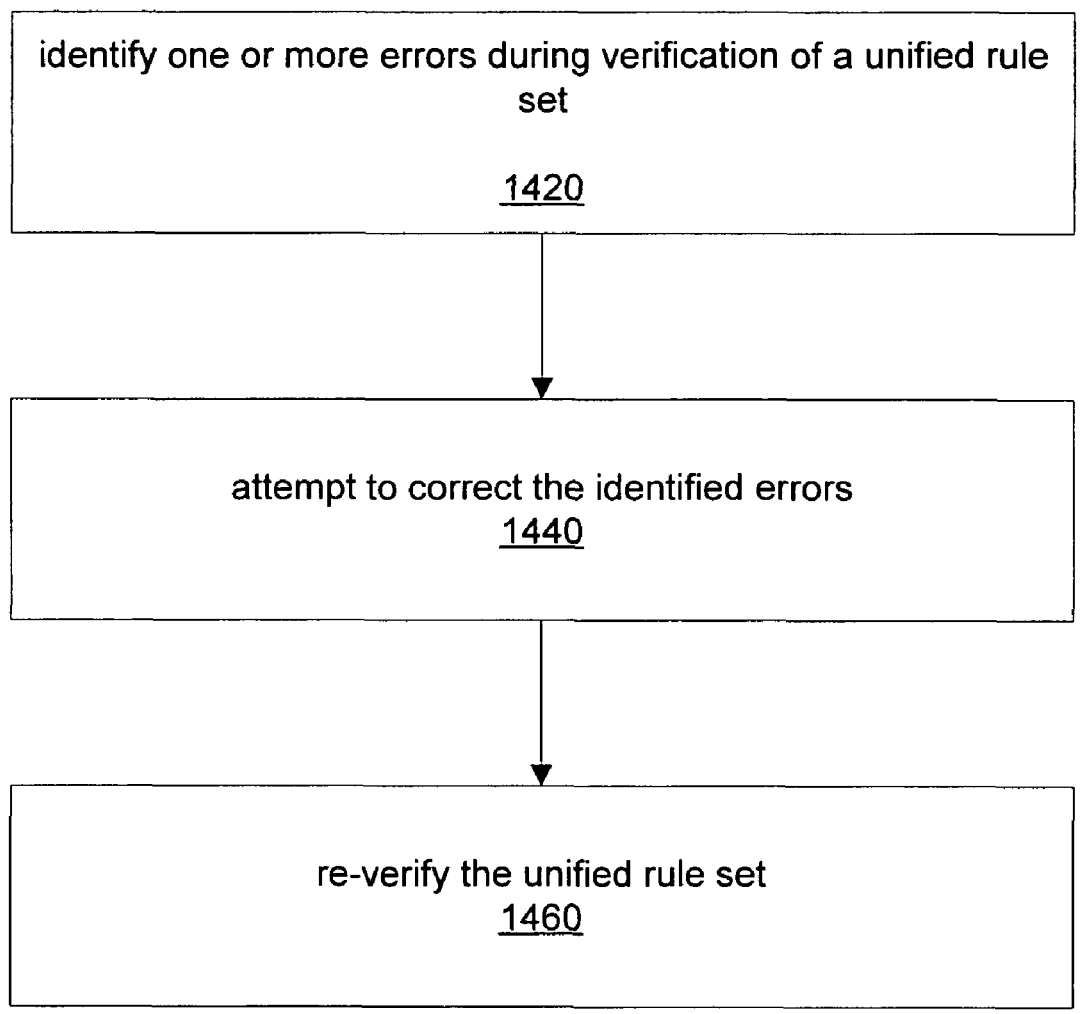
FIG. 14 is a flowchart illustrating, according to one embodiment, a method for correcting errors identified during verification of a unified rule set.

FIG. 14 is a flowchart illustrating, according to one embodiment, a method for correcting errors identified during verification of a unified rule set. In one embodiment, a flow manager, such as flow manager 120, may identify one or more errors during verification of a unified rule set, as illustrated by block 1420. As described above, a flow manager may utilize any, or a combination, of various verification techniques to identify potential errors or misconfiguration in a unified rule set.

After identifying errors in a unified rule set through verification, flow manager 120 may, in one embodiment, attempt to correct the identified errors as illustrated by block 1440. When attempting to correct errors identified in a unified rule set, a flow manager, such as flow manager 120 may utilize various techniques, such as implementing manual changes to the network services supplying the original packet flow rules, modifying one or more rules in the unified rule set, modifying one or more actions of one or more rules of the unified rule set, or taking no action for one or more of the errors further identified to be false positives.

As stated above and according to various embodiments, the handling of identified rule errors may include, but not be limited to, manual changes to network services configuration, rule set or action list optimization (either manual or programmatic) or no operation, in the case of false positives.

When attempting to correct errors found during verification of a unified rule set, flow manager 120 may be configured to report such errors to a user and may also be configured, in certain embodiments, to receive input specifying modifications to the unified rule set to correct the identified errors. In such an embodiment, flow manager 120 may also be configured to modify the unified rule set according to such input when attempting to correct the identified errors.

In another embodiment, flow manager 120 may be configured to receive input from a user specifying modifications to one or more actions lists of one or more rules of the unified rule set and may additionally be configured to modify the action lists of one or more rules according to the received input.

In certain embodiments, flow manager 120 may also be configured to recognize one or more identified errors as false positives. Such false positives, according to one embodiment, may represent situations that may frequently be errors, but due to the particular circumstances of the network topology, the network services, or the high level polices, may not be errors in every case. Thus, flow manager 120 may be configured to recognize such false positives. In one embodiment, flow manager 120 may present identified errors determined to be potential false positives to a user for manual determination of whether they are actual errors or false positives.

In certain embodiments, after attempting to correct any errors, a flow manager, such as flow manager 120, may be configured to re-verify a unified rule set, as illustrated by block 1640, no matter what method may be used to correct the errors. In such embodiments, re-verification may be done to ensure that changes made to correct errors or apply optimizations not only corrected the identified error, but also did not cause any additional errors, or violate any high level policy.

Figure 15:
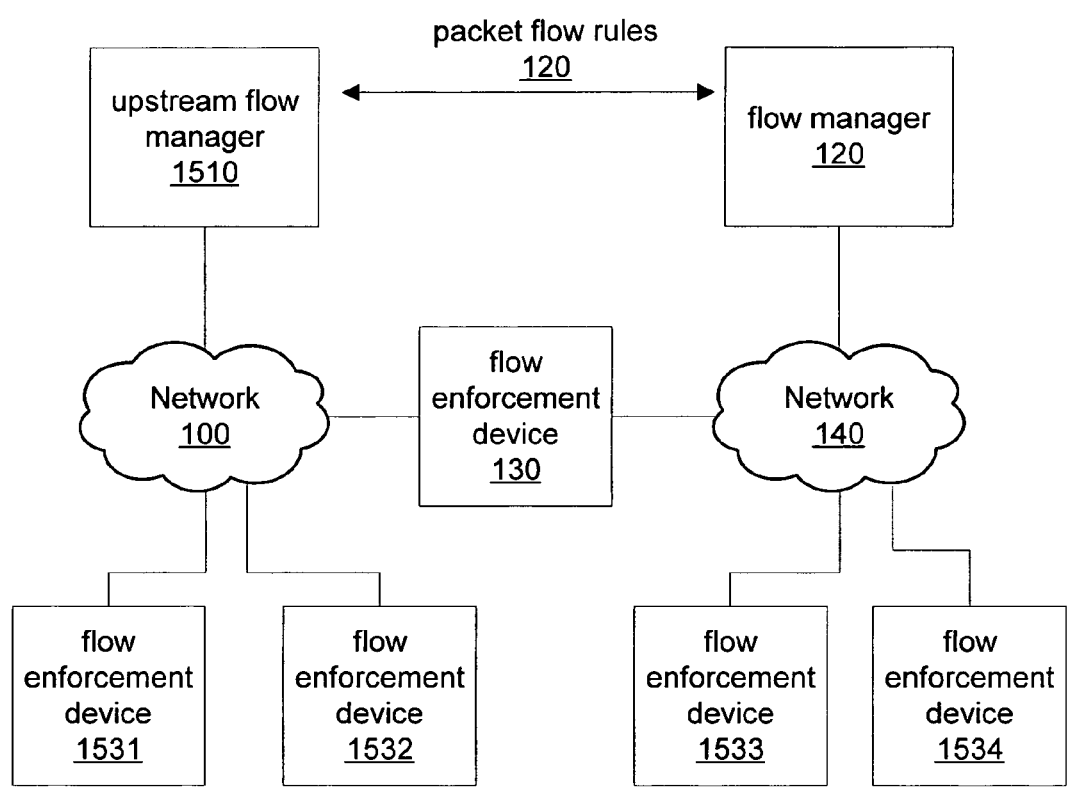
FIG. 15 is a block diagram illustrating, according to one embodiment, distributed flow enforcement.

FIG. 15 is a block diagram illustrating, according to one embodiment, distributed flow enforcement. According to certain embodiments, a flow manager, such as flow manager 120 or upstream flow manager 1510, may provide distributed management of flow enforcement policies for flow enforcement devices, such as flow enforcement device 130 or flow enforcement devices 1531-1534. As illustrated in FIG. 15 according to one embodiment, a flow manager, such as flow manager 120 or flow manager 1510, may manage multiple flow enforcement devices to ensure efficient enforcement flow policies as represented in a unified rule set, as described above.

In some embodiments, flow manager 120 may enforce flow enforcement policies from different policy domains and may manage flow enforcement policies that may be enforced over a number of flow enforcement devices, such as flow enforcement devices 1531-1534, place at various policy enforcement points in the data center network.

Flow enforcement devices may be placed in the data center network at various enforcement points under either the same administrative scope or different administrative scope, according to various embodiments. A single enforcement point may, in one embodiment, include multiple flow enforcement devices while appearing as a single functional unit in the network topology.

These enforcement points may include, but are not limited to the edge of a Data Center Network (entry point to the networked Data Center), The edge of a Network Server Farm, The edge of a Horizontally Scaled System, The transition point between tiers of the DCN, The edge of the networked server.

At each of these enforcement points, one or more flow enforcement devices may enforce flow enforcement policies, in certain embodiments. Moreover, each flow enforcement device may belong to one or more administrative scopes or domains.

In some embodiments, flow managers that manage downstream flow enforcement points, can inject policies into an upstream flow manager. For example, according to one embodiment illustrated by FIG. 15, flow manager 120 may be configured to send policies in the form of packet flow rules to upstream flow manager 1510. In such an embodiment, upstream flow manager 1510 in turn may generate a new unified flow enforcement policy or unified rule set that flow enforcement devices 1531 and 1532 may implement and enforce. Thus, upstream flow manager 1510 may be able to optimize network operation by implementing those policies of a downstream flow manager that can be implemented in the upstream flow manager's administrative domain without compromising the policy of the downstream administrative domain.

For example, flow manager 120 may send upstream flow manager 1510, which may be located at an edge of a data center network, one or more packet flow rules including drop actions, such a for firewalling. In such an example, upstream flow manager 1510 may then generate a new unified rule set incorporating the packet flow rules received from flow manager 120.

Figure 16:
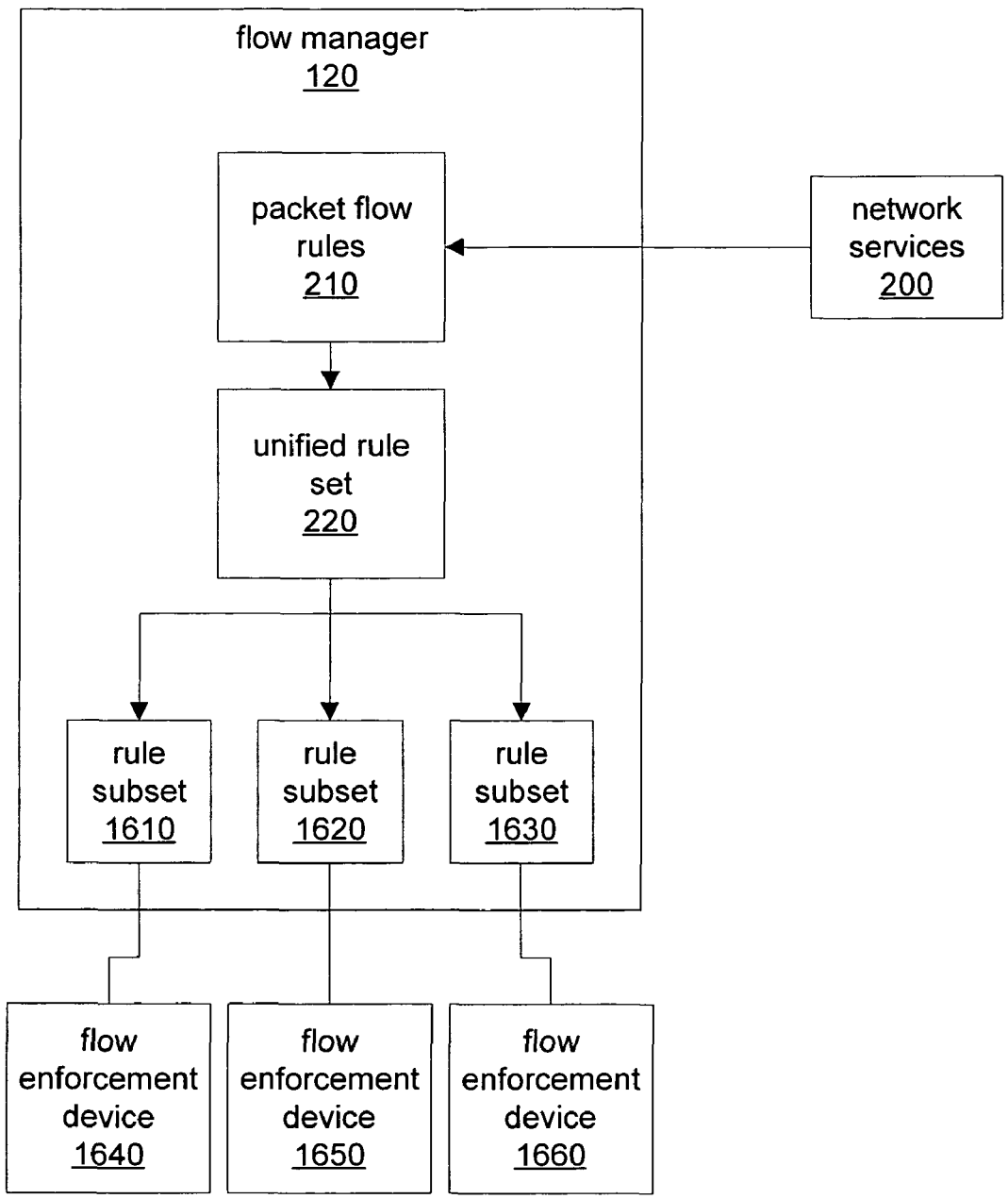
FIG. 16 is a block diagram illustrating, according to one embodiment, a flow manager generating rule subsets for enforcement by different flow enforcement devices.

FIG. 16 is a block diagram illustrating, according to one embodiment, a flow manager generating rule subsets for enforcement by different flow enforcement devices.

According to some embodiments, a flow manager, such as flow manager 120, may be configured to management multiple flow enforcement devices, such as flow enforcement devices 1640, 1650, and 1660. When management multiple flow enforcement devices, flow manager 120 may, in certain embodiments, segment or divide unified rule set 220, generated from packet flow rules 210 received from network services 220, into multiple rule subsets, one for each respective flow enforcement device that flow manager 120 is managing. Thus, in one embodiment, as illustrated by FIG. 16, flow manager 120 may divide unified rule set 220 into three rule subsets; rule subset 1610 for flow enforcement device 1640, rule subset 1620 for flow enforcement device 1650, and rule subset 1630 for flow enforcement device 1660.

Please note, that in one embodiment, flow manager 120 may be managing multiple flow enforcement devices where rather than segment the enforcement of flow policies among the flow enforcement devices, the enforcement load is spread across the flow enforcement devices, such that each rule subset may include the entire unified rule set 220.

In other embodiments, however, each rule subset may include a set of rules from the unified rule set distinct those rules in the other rule subsets. In yet other embodiments, each rule subset may include some rules that are distinct from the other rule subsets, but may also include rules that are include in all rule subsets.

When generating rule subsets 1610, 1620, and 1630, according to one embodiment, flow manager 120 may, instead of segmenting unified rule set 220, divide packet flow rules 210 and generate multiple unified rules sets corresponding to the final rule subsets required by the managed flow enforcement devices.

Figure 17:
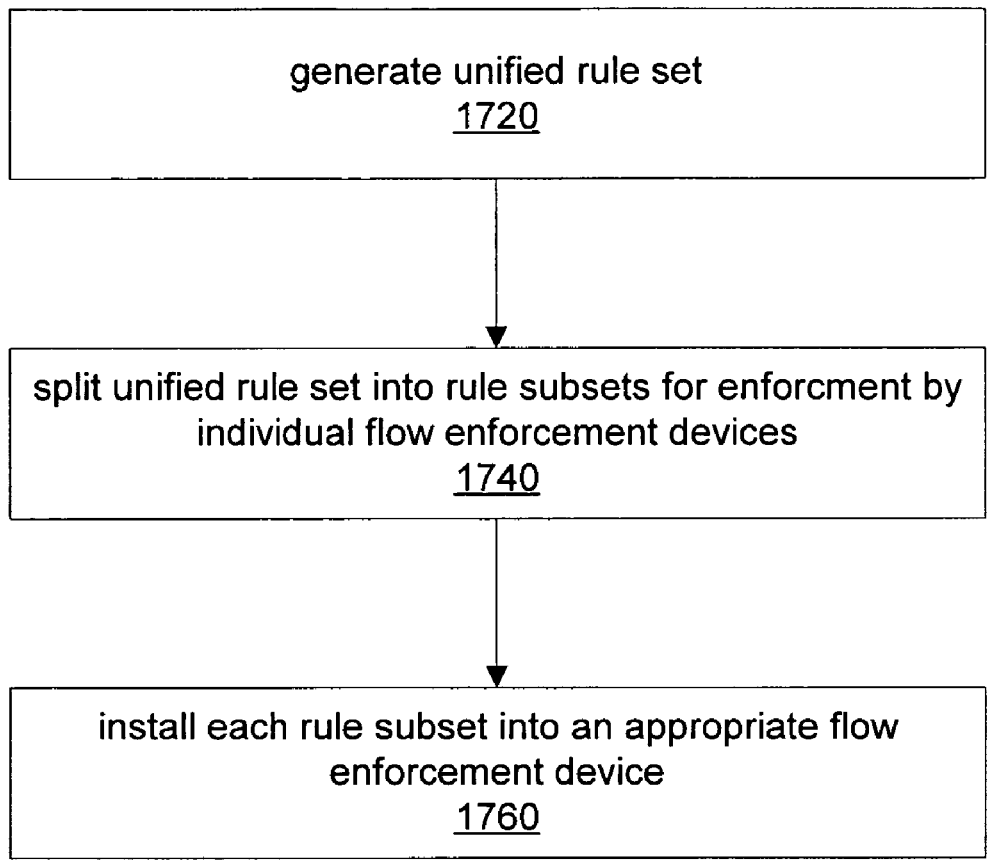
FIG. 17 is a flowchart illustrating, according to one embodiment, a method for implementing distributed flow enforcement.

FIG. 17 is a flowchart illustrating, according to one embodiment, a method for implementing distributed flow enforcement.

In one embodiment, a flow manager, such as flow manager 120, may generate a unified rule set, as illustrated by block 1720, and as described above. Additionally, flow manager 120 may split the unified rule set into rule subsets for enforcement by individual flow enforcement devices, as illustrated by block 1740, and may also install each rule subset into an appropriate flow enforcement device, as illustrated by block 1760, according to some embodiments.

Figure 18:
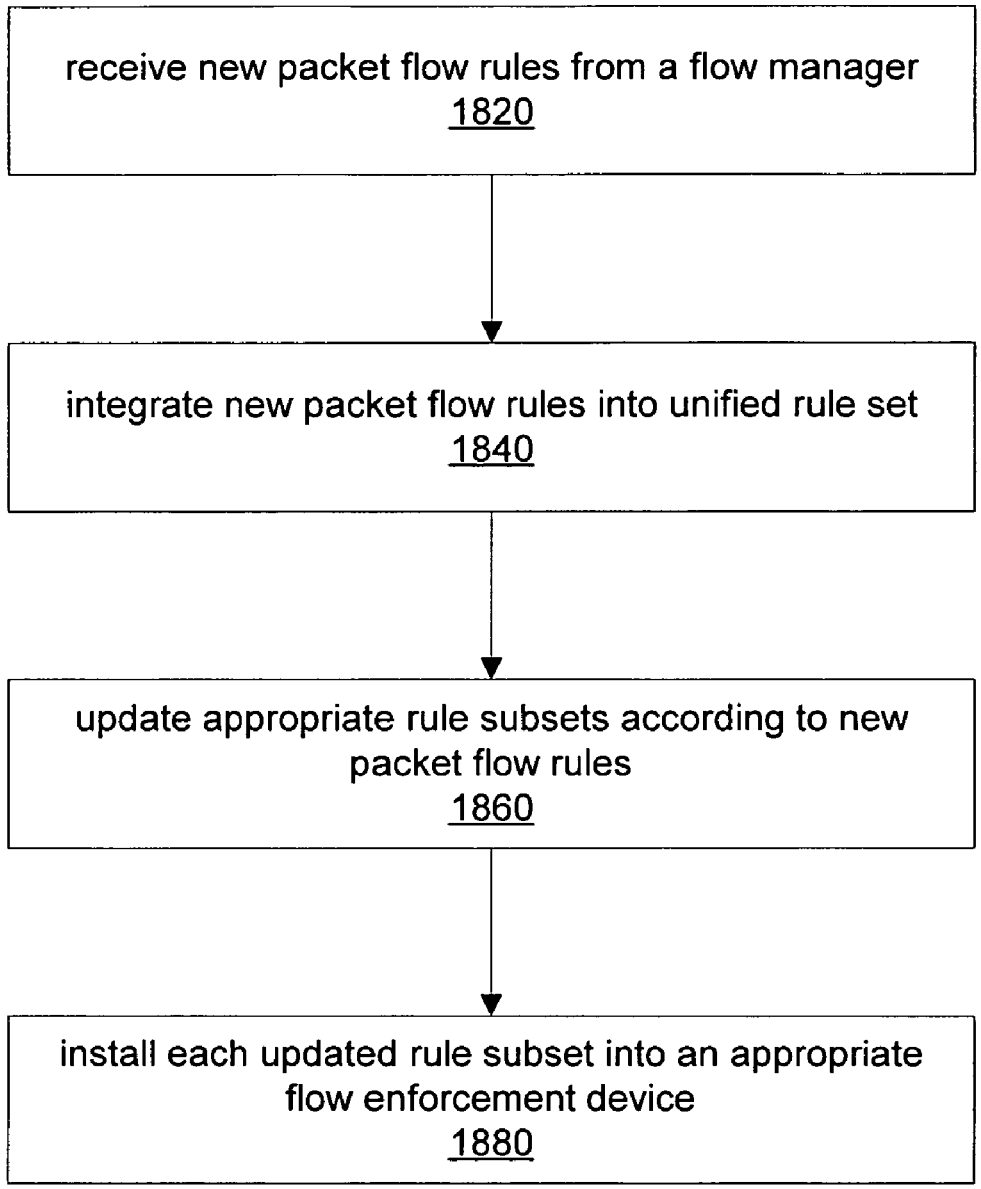
FIG. 18 is a flowchart illustrating, according to one embodiment, a method for cooperative distributed flow management.

FIG. 18 is a flowchart illustrating, according to one embodiment, a method for cooperative distributed flow management. According to certain embodiments, multiple flow managers may be configured to exchange flow enforcement policies with each other in order to cooperate during distributed flow management.

In on embodiment, a flow manager, such a upstream flow manager 1510, may be configured to receive new packet flow rules from another flow manager, such as flow manager 120, as illustrated by block 1820. After receiving such additional packet flow rules, upstream flow manager 1510 may, in some embodiments, integrate the new packet flow rules into a unified rule set. In one embodiment, upstream flow manager 1510 may be configured to add the new rules to an existing unified rule set generated as described herein, and may be configured to verify the new unified rule set after adding the new rules.

Additionally, upstream flow manager 1510 may also update any appropriate rule subsets according to the new packet flow rules and the new unified rule set, as illustrated by block 1860. Furthermore, upstream flow manager 1510 may install each updated rule subset into an appropriate flow enforcement device, as illustrated by block 1880.

Thus, not only may a single flow manager manage multiple flow enforcement devices in a global flow management model, but multiple flow managers may cooperate in either a peer-peer or a hierarchical arrangement to coordinate flow policy enforcement over different network topologies and domains, according to various embodiments. A flow manager may be configured, in certain embodiments, to implement any of three policy management models, such as global flow management model, the cooperative flow management model, and the individual flow management model.

According to one embodiment, when using any of the flow management models described above, a flow manager may be aware of the network topology for the portion of the data center network that the flow manager manages. Awareness of network topology and the flow enforcement policies that are to be implemented may be critical to providing proper and efficient policy enforcement in the portion of the data center network the flow manager manages, in some embodiments.

In some embodiments, the global flow management model may provide for the management of network flow enforcement policies by a single flow manager for all the enforcement points of the data center network. Thus, in one embodiment, a flow manager using global flow management may assume that it has administrative control over the policies for each of the flow enforcement devices placed at the enforcement points of the data center network. Moreover, in one embodiment a flow manager may optimize and unify the policies of the flow enforcement devices arranged in the data center network. In deploying the Global Flow Management Model, a flow manager may know the entire topology of the data center network and control all the enforcement points of the data center network, in certain embodiments.

According to some embodiments, the cooperative flow management model may provide for cooperation among flow managers controlling a set of flow enforcement devices. When employing cooperative flow management, flow managers may cooperatively share flow enforcement policies as packet flow rules. In this model, the flow managers may cooperate to build a unified policy for enforcement. According to certain embodiments, flow managers performing cooperative flow management may assume mutual trust relationships among themselves.

In some embodiments, the hierarchical flow management model may provide for a flow manager to control a single flow enforcement device. In one embodiment, a flow manager utilizing hierarchical flow management may employ a secure trust relationship between it and other flow managers to enable the unification of policies for enforcement within the scope of the data center network. The local flow manager may inject enforcement policies into a remote flow manager that manages a flow enforcement device upstream from the flow enforcement device that the local flow manager manages, according to certain embodiments.

According to some embodiments, multiple flow managers of different administrative scopes (e.g. network domains) may manage multiple packet enforcement policies by distributing enforcement policies from leaf flow managers to a master flow manager. In turn, a master flow manager may propagate enforcement policies to various flow enforcement devices. For example, flow manager 120 may distribute packet flow rules to upstream flow manager 1510 and in turn upstream flow manager 1510 may generate a unified rule set including the packet flow rules from flow manager 120 and distribute the unified rule set to flow enforcement devices, possibly by splitting the unified rule set into multiple rule subsets as described above.

Figure 19:
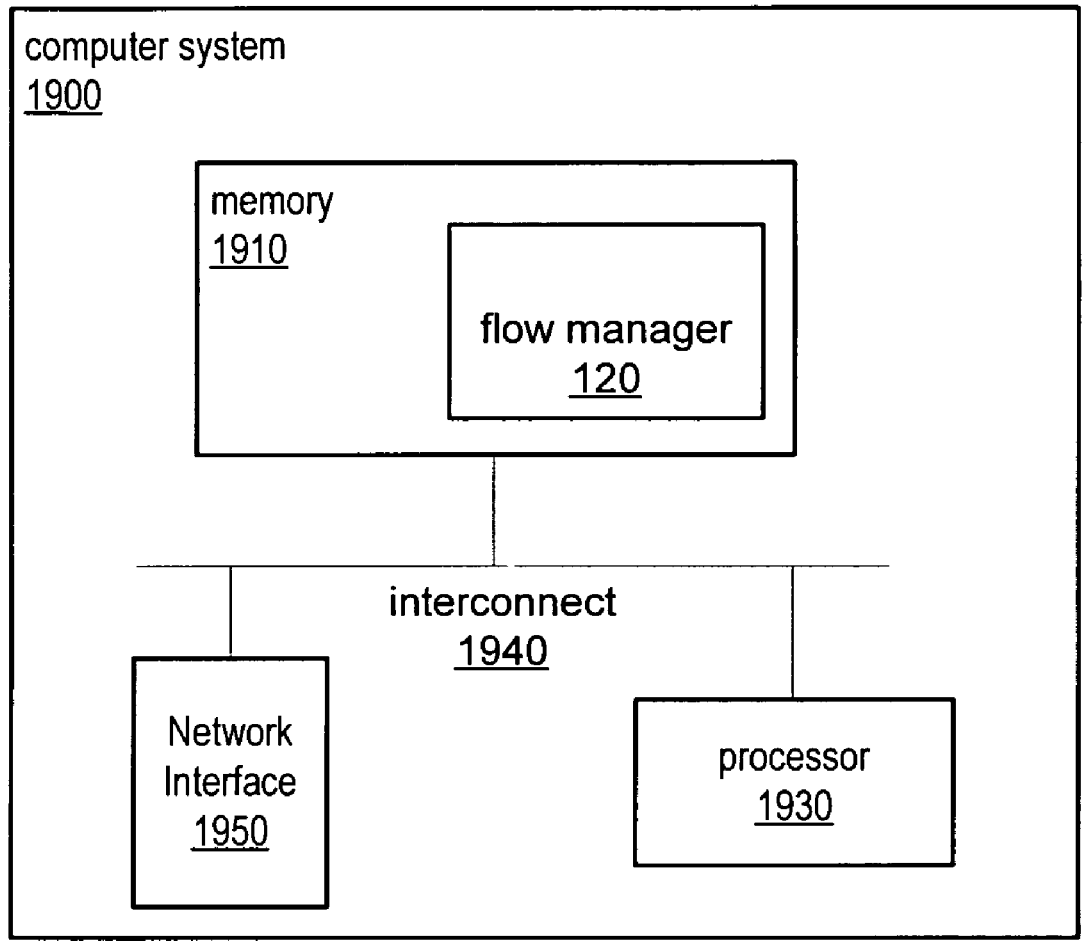
FIG. 19 is a block diagram illustrating a computer system suitable for implementing conflict rule resolution, rule verification, or distributed flow enforcement, as described herein, according to one embodiment.

FIG. 19 illustrates a computing system capable of conflict rule resolution, rule verification, or distributed flow enforcement as described herein and according to various embodiments. Computer system 1900 may be any of various types of devices, including, but not limited to, a personal computer system, desktop computer, laptop or notebook computer, mainframe computer system, handheld computer, workstation, network computer, a consumer device, or any type of networkable peripheral device such as storage devices, switches, modems, routers, etc, or in general any type of networkable computing device. Computer system 1900 may include at least one processor 1930. Processor 1930 may couple across interconnect 1940 to memory 1910.

Memory 1910 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 1910 may include program instructions configured to implement conflict rule resolution, rule verification, or distributed flow enforcement, as described herein. In certain embodiments memory 1910 may include program instructions configured to implement a flow manager, such as a flow manager 120. In such embodiments, flow manager 120 may include program instructions configured to implement conflict rule resolution, rule verification, or distributed flow enforcement, as described herein.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
receiving a plurality of packet flow rules from one or more network services;
generating a unified rule set according to the received packet flow rules, wherein the unified rule set comprises one or more prioritized rules each comprising a packet filter and one or more prioritized actions, and wherein each action is either terminating or non-terminating, wherein said generating comprises identifying one or more conflicts between the received packet flow rules and resolving the one or more identified conflicts according to priorities of the conflicting rules; and
subsequent to said identifying and said resolving, validating the unified rule set to identify errors.

2. The method of claim 1, wherein said validating comprises comparing the unified rule set against one or more defined policies.

3. The method of claim 1, wherein said validating comprises applying the unified rule set to one or more simulated network packets.

4. The method of claim 3, wherein the simulated network packets comprise one or more network packets captured during live network traffic.

5. The method of claim 3, wherein the simulated network packets comprise one or more generated packets based on user specified packet sources and destinations.

6. The method of claim 1, wherein said validating comprises identifying one or more extraneous rules.

7. The method of claim 6, wherein said identifying one or more extraneous rules comprises identifying a plurality of rules with identical packet filters; wherein a higher priority one of the rules comprises a terminating action.

8. The method of claim 6, wherein said identifying one or more extraneous rules comprises identifying two rules with identical action lists; wherein one of the rules has a higher priority and the other has a lower priority, and wherein the higher priority rule comprises a packet filter that specifies a subset of the packet flow specified by the lower priority rule's packet filter.

9. The method of claim 1, wherein said validating comprises identifying one or more extraneous actions.

10. The method of claim 9, wherein said identifying one or more extraneous actions comprises identifying a rule that comprises a plurality of actions, wherein a terminating one of the actions has a higher priority than a non-terminating action.

11. The method of claim 1, wherein said validating comprises:
   presenting the unified rule set to a user for manual verification; and
   receiving input identifying one or more errors in the unified rule set.

12. The method of claim 11, further comprising receiving input specifying modifications to the unified rule set to correct the identified errors.

13. The method of claim 11, further comprising modifying the unified rule set to correct the identified errors.

14. The method of claim 11, further comprising:
   receiving one or more new packet flow rules from at least one of the network services for correction of the identified errors;
   generating a new unified rule set according to the received new packet flow rules; and
   validating the new unified rule set to identify new errors.

15. The method of claim 11, further comprising modifying the action list of one or more rules to correct the identified errors.

16. The method of claim 11, further comprising determining that one or more of the identified errors are false positives.

17. The method of claim 1, further comprising:
   modifying the unified rule set to correct the identified errors; and
   revalidating the unified rule set to identifying new errors.

18. The method of claim 17, further comprising repeating said modifying, and said revalidating until no errors are identified during said revalidating.

19. The method of claim 17, wherein said modifying comprises:
   adding one or more rules to the unified rule set;
   deleting one or more rules from the unified rule set; and/or
   modifying one or more rules of the unified rule set.

20. A device, comprising:
   a processor; and
   a memory coupled to the processor, wherein the memory stores program instructions executable by the processor to implement:
      receiving a plurality of packet flow rules from one or more network services;
      generating a unified rule set according to the received packet flow rules, wherein the unified rule set comprises one or more prioritized rules each comprising a packet filter and one or more prioritized actions, and wherein each action is either terminating or non-terminating, wherein said generating comprises identifying one or more conflicts between the received packet flow rules and resolving the one or more identified conflicts according to priorities of the conflicting rules; and
      subsequent to said identifying and said resolving, validating the unified rule set to identify errors.

21. The device of claim 20, wherein in said validating the program instructions are configured to compare the unified rule set against one or more defined policies.

22. The device of claim 20, wherein in said validating the program instructions are configured to apply the unified rule set to one or more simulated network packets.

23. The device of claim 22, wherein the simulated network packets comprise one or more network packets captured during live network traffic.

24. The device of claim 22, wherein the simulated network packets comprise one or more generated packets based on user specified packet sources and destinations.

25. The device of claim 20, wherein in said validating the program instructions are configured to identify one or more extraneous rules.

26. The device of claim 25, wherein in said identifying one or more extraneous rules the program instructions are configured to identify a plurality of rules with identical packet filters; wherein a higher priority one of the rules comprises a terminating action.

27. The device of claim 26, wherein in said identifying one or more extraneous rules the program instructions are configured to identify two rules with identical action lists; wherein one of the rules has a higher priority and the other has a lower priority, and wherein the higher priority rule comprises a packet filter that specifies a subset of the packet flow specified by the lower priority rule's packet filter.

28. The device of claim 20, wherein in said validating the program instructions are configured to identify one or more extraneous actions.

29. The device of claim 28, wherein in said identifying one or more extraneous actions the program instructions are configured to identify a rule that comprises a plurality of actions, wherein a terminating one of the actions has a higher priority than a non-terminating action.

30. The device of claim 20, wherein in said validating the program instructions are configured to:
   present the unified rule set to a user for manual verification; and
   receive input identifying one or more errors in the unified rule set.

31. The device of claim 30, wherein the program instructions are further configured to receive input specifying modifications to the unified rule set to correct the identified errors.

32. The device of claim 30, wherein the program instructions are further configured to modify the unified rule set to correct the identified errors.

33. The device of claim 30, wherein the program instructions are further configured to:
   receive one or more new packet flow rules from at least one of the network services for correction of the identified errors;
   generate a new unified rule set according to the received new packet flow rules; and
   validate the new unified rule set to identify new errors.

34. The device of claim 30, wherein the program instructions are further configured to modify the action list of one or more rules to correct the identified errors.

35. The device of claim 30, wherein the program instructions are further configured to determine that one or more of the identified errors are false positives.

36. The device of claim 20, wherein the program instructions are further configured to:
   modify the unified rule set to correct the identified errors; and
   revalidate the unified rule set to identifying new errors.

37. The device of claim 36, wherein the program instructions are further configured to repeat said modifying, and said revalidating until no errors are identified during said revalidating.

38. The device of claim 36, wherein in said modifying the program instructions are configured to:
   add one or more rules to the unified rule set;
   delete one or more rules from the unified rule set; and/or
   modify one or more rules of the unified rule set.

39. A computer accessible storage medium, storing program instructions computer-executable to implement:
receiving a plurality of packet flow rules from one or more network services;
generating a unified rule set according to the received packet flow rules, wherein the unified rule set comprises one or more prioritized rules each comprising a packet filter and one or more prioritized actions, and wherein each action is either terminating or non-terminating, wherein said generating comprises identifying one or more conflicts between the received packet flow rules and resolving the one or more identified conflicts according to priorities of the conflicting rules; and
subsequent to said identifying and said resolving, validating the unified rule set to identify errors.

40. The computer accessible storage medium of claim 39, wherein in said validating the program instructions are computer-executable to implement comparing the unified rule set against one or more defined policies.

41. The computer accessible storage medium of claim 39, wherein in said validating the program instructions are computer-executable to implement applying the unified rule set to one or more simulated network packets.

42. The computer accessible storage medium of claim 41, wherein the simulated network packets comprise one or more network packets captured during live network traffic.

43. The computer accessible storage medium of claim 41, wherein the simulated network packets comprise one or more generated packets based on user specified packet sources and destinations.

44. The computer accessible storage medium of claim 38, wherein in said validating the program instructions are computer-executable to implement identifying one or more extraneous rules.

45. The computer accessible storage medium of claim 44, wherein in said identifying one or more extraneous rules the program instructions are computer-executable to implement identifying a plurality of rules with identical packet filters; wherein a higher priority one of the rules comprises a terminating action.

46. The computer accessible storage medium of claim 44, wherein in said identifying one or more extraneous rules the program instructions are computer-executable to implement identifying two rules with identical action lists; wherein one of the rules has a higher priority and the other has a lower priority, and wherein the higher priority rule comprises a packet filter that specifies a subset of the packet flow specified by the lower priority rule's packet filter.

47. The computer accessible storage medium of claim 39, wherein in said validating the program instructions are computer-executable to implement identifying one or more extraneous actions.

48. The computer accessible storage medium of claim 47, wherein in said identifying one or more extraneous actions the program instructions are computer-executable to implement identifying a rule that comprises a plurality of actions, wherein a terminating one of the actions has a higher priority than a non-terminating action.

49. The computer accessible storage medium of claim 39, wherein in said validating the program instructions are computer-executable to implement:
presenting the unified rule set to a user for manual verification; and
receiving input identifying one or more errors in the unified rule set.

50. The computer accessible storage medium of claim 49, wherein the program instructions are further computer-executable to implement receiving input specifying modifications to the unified rule set to correct the identified errors.

51. The computer accessible storage medium of claim 49, wherein the program instructions are further computer-executable to implement modifying the unified rule set to correct the identified errors.

52. The computer accessible storage medium of claim 49, wherein the program instructions are further computer-executable to implement:
receiving one or more new packet flow rules from at least one of the network services for correction of the identified errors;
generating a new unified rule set according to the received new packet flow rules; and
validating the new unified rule set to identify new errors.

53. The computer accessible storage medium of claim 49, wherein the program instructions are further computer-executable to implement modifying the action list of one or more rules to correct the identified errors.

54. The computer accessible storage medium of claim 49, wherein the program instructions are further computer-executable to implement determining that one or more of the identified errors are false positives.

55. The computer accessible storage medium of claim 39, wherein the program instructions are further computer-executable to implement:
modifying the unified rule set to correct the identified errors; and
revalidating the unified rule set to identifying new errors.

56. The computer accessible storage medium of claim 55, wherein the program instructions are further computer-executable to implement repeating said modifying, and said revalidating until no errors are identified during said revalidating.

57. The computer accessible storage medium of claim 55, wherein in said modifying the program instructions are computer-executable to implement:
adding one or more rules to the unified rule set;
deleting one or more rules from the unified rule set; and/or
modifying one or more rules of the unified rule set.

* * * * *